United States Patent
Bellorado et al.

(10) Patent No.: US 10,243,703 B1
(45) Date of Patent: Mar. 26, 2019

(54) PREAMBLE DETECTION AND FREQUENCY OFFSET DETERMINATION

(71) Applicant: Seagate Technology LLC, Cupertino, CA (US)

(72) Inventors: Jason Vincent Bellorado, San Jose, CA (US); Marcus Marrow, San Jose, CA (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/810,545

(22) Filed: Nov. 13, 2017

Related U.S. Application Data

(63) Continuation of application No. 15/295,958, filed on Oct. 17, 2016, now Pat. No. 9,819,456.

(51) Int. Cl.
*H04L 1/20* (2006.01)
*H04L 12/801* (2013.01)
*H04W 84/12* (2009.01)

(52) U.S. Cl.
CPC .............. *H04L 1/206* (2013.01); *H04L 47/29* (2013.01); *H04W 84/12* (2013.01)

(58) Field of Classification Search
USPC .......................... 375/362, 260; 370/459, 252
See application file for complete search history.

(56) References Cited

U.S. PATENT DOCUMENTS

| | | |
|---|---|---|
| 5,563,746 A | 10/1996 | Bliss |
| 5,726,818 A | 3/1998 | Reed et al. |
| 5,754,352 A | 5/1998 | Behrens et al. |
| 5,793,548 A | 8/1998 | Zook |
| 5,822,142 A | 10/1998 | Hicken |
| 5,909,332 A | 6/1999 | Spurbeck et al. |
| 5,954,837 A | 9/1999 | Kim |
| 6,069,758 A | 5/2000 | Chung |
| 6,172,836 B1 | 1/2001 | Bang |
| 6,275,346 B1 | 8/2001 | Kim et al. |
| 6,307,696 B1 | 10/2001 | Bishop et al. |
| 6,353,649 B1 | 3/2002 | Bockleman et al. |
| 6,480,349 B1 | 11/2002 | Kim et al. |
| 6,594,094 B2 | 7/2003 | Rae |
| 6,594,098 B1 | 7/2003 | Sutardja |
| 6,760,185 B1 | 7/2004 | Roth et al. |
| 6,973,150 B1 | 12/2005 | Thuringer |

(Continued)

*Primary Examiner* — Eva Y Puente
(74) *Attorney, Agent, or Firm* — Cesari & Reed, LLP; Kirk A. Cesari; Christian Best

(57) ABSTRACT

Systems and methods are disclosed for detection of a selected signal pattern, such as a servo sector preamble, and for frequency offset determination. A circuit may be configured to divide a signal into detection windows of a selected size, and sample the signal a selected number of times within each detection window. The circuit may then determine an error value for each detection window based on values of the samples for each detection window, and determine the preamble is detected when a threshold number of most-recently sampled detection windows have error values below a threshold value. The circuit may then organize the sample values corresponding to the preamble into groups, and calculate phase estimates representing a phase at which the groups were sampled. The circuit may determine a frequency offset based on the phase estimates, and modulate the sampling frequency according to the frequency offset.

20 Claims, 14 Drawing Sheets

(56) References Cited

U.S. PATENT DOCUMENTS

| | | |
|---|---|---|
| 6,996,193 B2 | 2/2006 | Yamagata et al. |
| 7,035,029 B2 | 4/2006 | Sawada et al. |
| 7,068,461 B1 | 6/2006 | Chue et al. |
| 7,199,956 B1 | 4/2007 | Moser et al. |
| 7,297,582 B2 | 11/2007 | Asakura et al. |
| 7,602,568 B1 | 10/2009 | Katchmart |
| 7,643,548 B2 | 1/2010 | Hafeez |
| 7,665,007 B2 | 2/2010 | Yang et al. |
| 7,738,538 B1 | 6/2010 | Tung |
| 7,917,563 B1 | 3/2011 | Shih et al. |
| 7,995,691 B2 | 8/2011 | Yang |
| 8,077,571 B1 | 12/2011 | Xia et al. |
| 8,139,305 B2 | 3/2012 | Mathew et al. |
| 8,266,505 B2 | 9/2012 | Liu et al. |
| 8,400,726 B1 | 3/2013 | Zheng |
| 8,516,347 B1 | 8/2013 | Li et al. |
| 8,625,216 B2 | 1/2014 | Zhang et al. |
| 9,043,688 B1 | 5/2015 | Chan et al. |
| 9,077,501 B1 | 7/2015 | Oberg et al. |
| 9,129,646 B2 | 9/2015 | Mathew et al. |
| 9,178,625 B1 | 11/2015 | Hueda et al. |
| 9,236,952 B2 | 1/2016 | Sun |
| 9,362,933 B1 | 6/2016 | Chaichanavong |
| 9,613,652 B2 | 4/2017 | Link et al. |
| 2002/0094048 A1* | 7/2002 | Simmons .............. H04L 7/042 |
| | | 375/362 |
| 2003/0026016 A1* | 2/2003 | Heydari ............. G11B 5/59655 |
| | | 360/29 |
| 2003/0048562 A1* | 3/2003 | Heydari ............. G11B 5/59633 |
| | | 360/51 |
| 2003/0185291 A1 | 10/2003 | Nakahira et al. |
| 2004/0047403 A1 | 3/2004 | Choi et al. |
| 2007/0002890 A1* | 1/2007 | Mangold ................ H04W 8/22 |
| | | 370/459 |
| 2007/0018733 A1 | 1/2007 | Wang |
| 2007/0205833 A1 | 9/2007 | Mar et al. |
| 2008/0292029 A1 | 11/2008 | Koslov |
| 2009/0268857 A1 | 10/2009 | Chen |
| 2010/0138722 A1 | 6/2010 | Harley |
| 2010/0211830 A1 | 8/2010 | Sankaranarayanan et al. |
| 2010/0272150 A1 | 10/2010 | Kil et al. |
| 2011/0072330 A1 | 3/2011 | Kolze |
| 2011/0158359 A1 | 6/2011 | Khayrallah et al. |
| 2013/0182347 A1 | 7/2013 | Maeto |
| 2013/0339827 A1 | 12/2013 | Han et al. |
| 2014/0337676 A1 | 11/2014 | Yen et al. |
| 2014/0355147 A1 | 12/2014 | Cideciyan et al. |
| 2015/0124912 A1 | 5/2015 | Eliaz et al. |
| 2015/0179213 A1 | 6/2015 | Liao et al. |
| 2015/0189574 A1* | 7/2015 | Ng ........................ H04W 24/08 |
| | | 370/252 |
| 2016/0055882 A1 | 2/2016 | Cideciyan et al. |
| 2016/0134449 A1 | 5/2016 | Liu et al. |
| 2016/0156493 A1* | 6/2016 | Bae ...................... H04L 27/266 |
| | | 375/260 |
| 2016/0270058 A1* | 9/2016 | Furuskog ............. H04L 1/0006 |
| 2016/0293205 A1 | 10/2016 | Jury et al. |
| 2017/0162224 A1 | 6/2017 | Mathew et al. |

\* cited by examiner

PREAMBLE DETECTION AND FREQUENCY OFFSET DETERMINATION

CROSS-REFERENCE TO RELATED APPLICATION

The present application is a continuation of and claims priority to pending U.S. patent application, application Ser. No. 15/295,958, filed Oct. 17, 2016, entitled "Preamble Detection and Frequency Offset Determination", the contents of which are hereby incorporated by reference in their entirety.

SUMMARY

In certain embodiments, an apparatus may comprise a circuit configured to detect a preamble within a signal. The circuit may be configured to divide the signal into timing windows of a selected size, and sample the signal a selected number of times within each timing window. The circuit may then determine an error value for each timing window based on values of the samples for each timing window, and determine the preamble is detected when a selected proportion of most-recently sampled timing windows have error values below a threshold value.

In certain embodiments, an apparatus may comprise a circuit configured to modulate a sampling frequency for a signal. The circuit may sample the signal to obtain sample values corresponding to a selected signal pattern, and organize the sample values into groups based on detection windows in which the sample values were obtained, wherein a detection window represents a selected number of samples obtainable in a set number of periods of the selected signal pattern. The circuit may then calculate phase estimates representing a phase at which the groups were sampled, determine a frequency offset based on the phase estimates, and modulate the sampling frequency according to the frequency offset.

In certain embodiments, a method may comprise detecting a selected signal pattern within a signal via a channel circuit. The method may include dividing the signal into detection windows of a selected size duration, sampling the signal a selected number of times within each detection window to obtain sample values, and determining an error value for each detection window based on the sample values for each timing window. The method may then include determining the selected signal pattern is detected when a threshold number of most-recently sampled detection windows have error values below a threshold value.

DETAILED DESCRIPTION

In the following detailed description of certain embodiments, reference is made to the accompanying drawings which form a part hereof, and in which are shown by way of illustration of example embodiments. It is also to be understood that features of the embodiments and examples herein can be combined, exchanged, or removed, other embodiments may be utilized or created, and structural changes may be made without departing from the scope of the present disclosure.

In accordance with various embodiments, the methods and functions described herein may be implemented as one or more software programs running on a computer processor or controller. Dedicated hardware implementations including, but not limited to, application specific integrated circuits, programmable logic arrays, and other hardware devices can likewise be constructed to implement the methods and functions described herein. Methods and functions may be performed by modules, which may include one or more physical components of a computing device (e.g., logic, circuits, processors, etc.) configured to perform a particular task or job, or may include instructions that, when executed, can cause a processor to perform a particular task or job, or any combination thereof. Further, the methods described herein may be implemented as a computer readable storage medium or memory device including instructions that, when executed, cause a processor to perform the methods.

Figure 1:
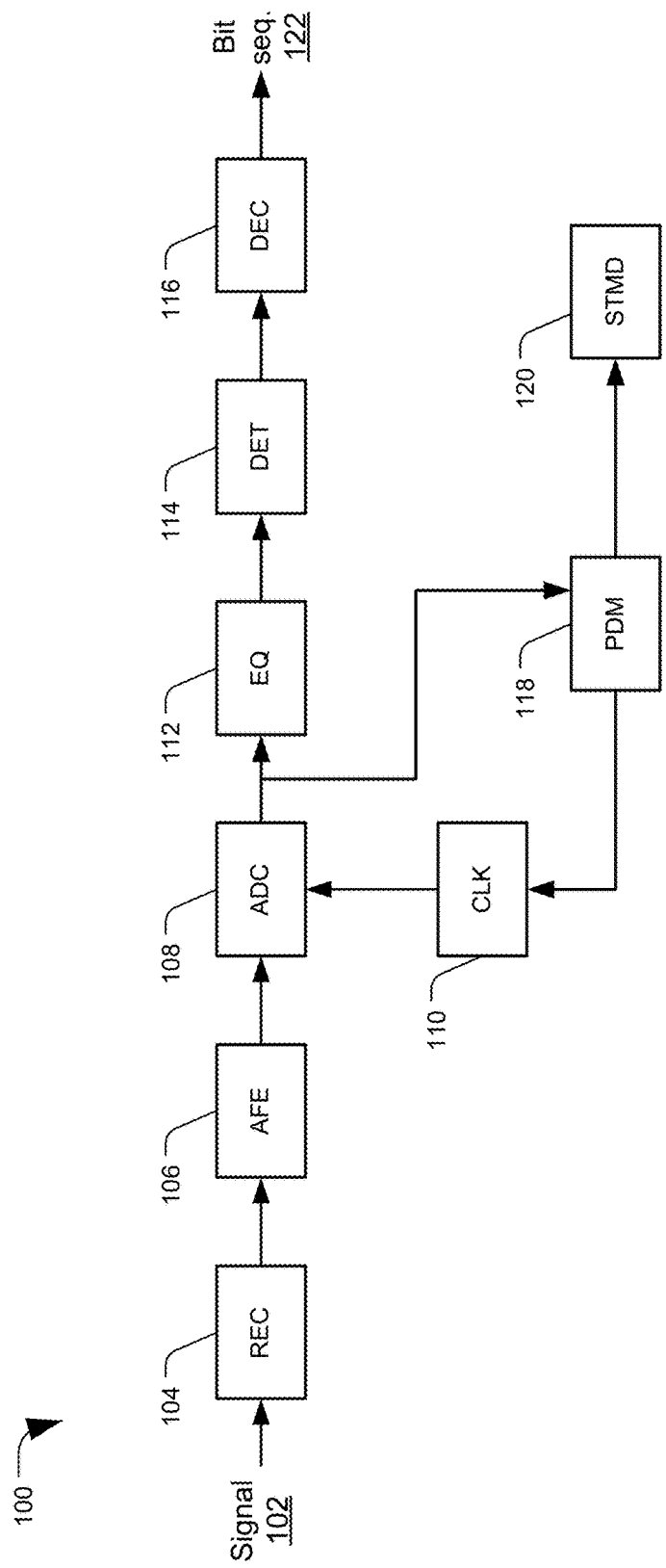
FIG. 1 is a diagram of a system configured to perform preamble detection and frequency offset determination, in accordance with certain embodiments of the present disclosure.

FIG. 1 is a diagram of a system configured to perform preamble detection and frequency offset estimation, generally designated 100, in accordance with certain embodiments of the present disclosure. The system 100 may include components of a communications channel by which an information signal 102 is received and processed to obtain data, such as a sequence of bits 122. The components of the channel may include circuitry, registers, and modules configured to perform operations in relation to a signal, and may be included on one or more chips of a device. A channel may be employed at a receiving end of wired or wireless transmissions, or in devices such as hard drives for storing data to and retrieving data from a storage medium. Some storage devices, such as hard disc drives, may include more than one channel, such as a data channel for processing data storage sectors, and a servo channel for processing servo sectors. Although examples and illustrative embodiments provided herein may be directed to implementations within a data storage device (DSD), the applicability of the techniques are not limited thereto. Similarly, while examples provided herein may be directed to detecting preamble signal patterns, other particular or selected signal patterns may be detected as described herein.

System 100 may include a receiver 104 configured to receive a signal 102. For example, the receiver 104 may be an antennae that receives wireless signals 102, or a read head that detects magnetic fields 102 stored to a hard drive. The receiver 104 may provide the received signal to an analog front end (AFE) 106, which may be circuitry configured to condition an analog signal via amplifiers, filters, and other operations, before providing the conditioned signal to other components for further processing. An analog to digital converter (ADC) 108 may periodically sample the conditioned analog signal at a frequency controlled by a clock signal generator 110. The clock signal frequency may be modified by adjusting the frequency at which clock signals are generated by the clock signal generator 110, or by applying an interpolation filter to the clock signals. Sampling the signal may include converting a continuous physical quantity (e.g. voltage) of the signal into a digital number or value representing the quantity's amplitude. The sampled values may be used to determine patterns in the signal which may be used to extract digital bits of information from the signal. The digital values from the ADC 108 may be provided to an equalizer 112, which may reverse or reduce distortions in the signal. The equalized signal may be provided to a detector 114, which may determine the bit sequence provided by the signal based on the sampled values from the ADC (e.g. whether the sample values indicate a 1 or a 0). The detected bit stream may be passed to a decoder 116, which may decode the bit stream into usable data. For example, the data in the signal 102 may be encoded with an error correction code, and the decoder 116 may attempt to determine and correct errors in the received detected bits based on the error correction code. The decoder 116 may output a bit sequence 122 of decoded and error-corrected bits, representing the data encoded within the signal 102.

Channel 100 may be used to detect a particular pattern within a signal, and use the pattern to synchronize the sampling frequency to the signal. For example, data or servo sectors recorded to a hard disc or other rotating storage media may be preceded by a preamble signal pattern that identifies the beginning of the sector, and a data channel of a storage device may locate and synchronize to the preamble. System 100 may include a preamble detection module (PDM) 118. The PDM 118 may identify a preamble or other selected signal pattern based on sampled values from the ADC 108 or from another component, e.g. after the samples have undergone additional processing. The PDM 118 may further determine or estimate a frequency offset identifying a difference in the sampling frequency at the ADC 108 compared to an ideal or selected sampling frequency relative to a period of the signal 102. The determined frequency offset may be used to adjust a clock signal frequency produced by the clock signal generator 110 (or by applying an interpolation filter to the clock signal to undo the frequency offset) in order to adjust a sampling frequency at the ADC 108 towards the selected sampling frequency. In systems having multiple channels that may process the same signal, the frequency offset may be provided to other channels or clock signal generators. The detection of preambles and frequency offset determination will be discussed in greater detail in regards to the following figures.

Preambles may be followed by a sync mark or servo timing mark, a known pattern preceding data and servo sectors. Once the PDM 118 identifies a preamble, a signal may be provided to a servo timing mark detector 120, which may then search for an expected sync mark or servo timing mark. Once the sync mark or servo timing mark is detected, a DSD may then read the data following the sync mark from the sector. Example DSD systems are shown in regard to FIGS. 2-5.

Figure 2:
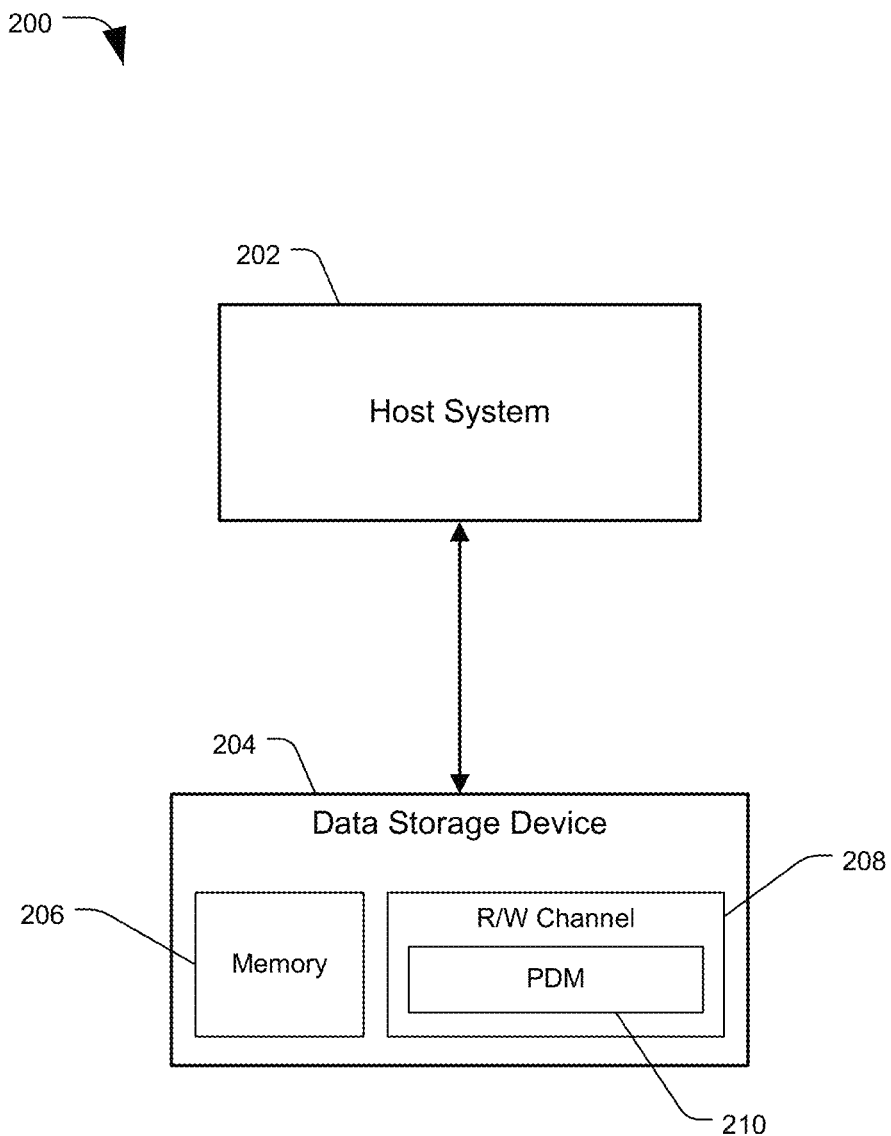
FIG. 2 is a diagram of a system configured to perform preamble detection and frequency offset determination, in accordance with certain embodiments of the present disclosure.

FIG. 2 is a diagram of a system configured to perform preamble detection and frequency offset estimation, generally designated 200, in accordance with certain embodiments of the present disclosure. The system 200 may include a host 202 and a data storage device (DSD) 204. The host 202 may also be referred to as the host system or host computer. The host 202 can be a desktop computer, a laptop computer, a server, a tablet computer, a telephone, a music player, another electronic device, or any combination thereof. Similarly, the DSD 204 may be any of the above-listed devices, or any other device which may be used to store or retrieve data, such as a hard disc drive (HDD). The host 202 and DSD 204 may be connected by way of a wired or wireless connection, or by a local area network (LAN) or wide area network (WAN). In some embodiments, the DSD 204 can be a stand-alone device not connected to a host 202 (e.g. a removable data storage device having its own case or housing), or the host 202 and DSD 204 may both be part of a single unit (e.g. a computer having an internal hard drive).

The DSD 204 may include a memory 206 and a read/write (R/W) channel 208, such as the channel described in regards to FIG. 1. The memory 106 may comprise one or more data storage mediums, such as magnetic storage media like disc drives, other types of memory, or a combination thereof. The DSD 204 may receive a data access request, such as a read or write request, from the host device 202. In response, the DSD 204 may perform data access operations on the memory 206 via the R/W channel 208 based on the request. The R/W channel 208 may comprise one or more circuits or processors configured to process signals for recording to or reading from the memory 206.

DSD 204 may include a preamble detection module (PDM) 210, such as the PDM 118 of FIG. 1. The PDM 210 may perform the methods and processes described herein to detect a selected signal pattern, and to determine a frequency offset of a sampling phase used to sample a signal.

Figure 3:
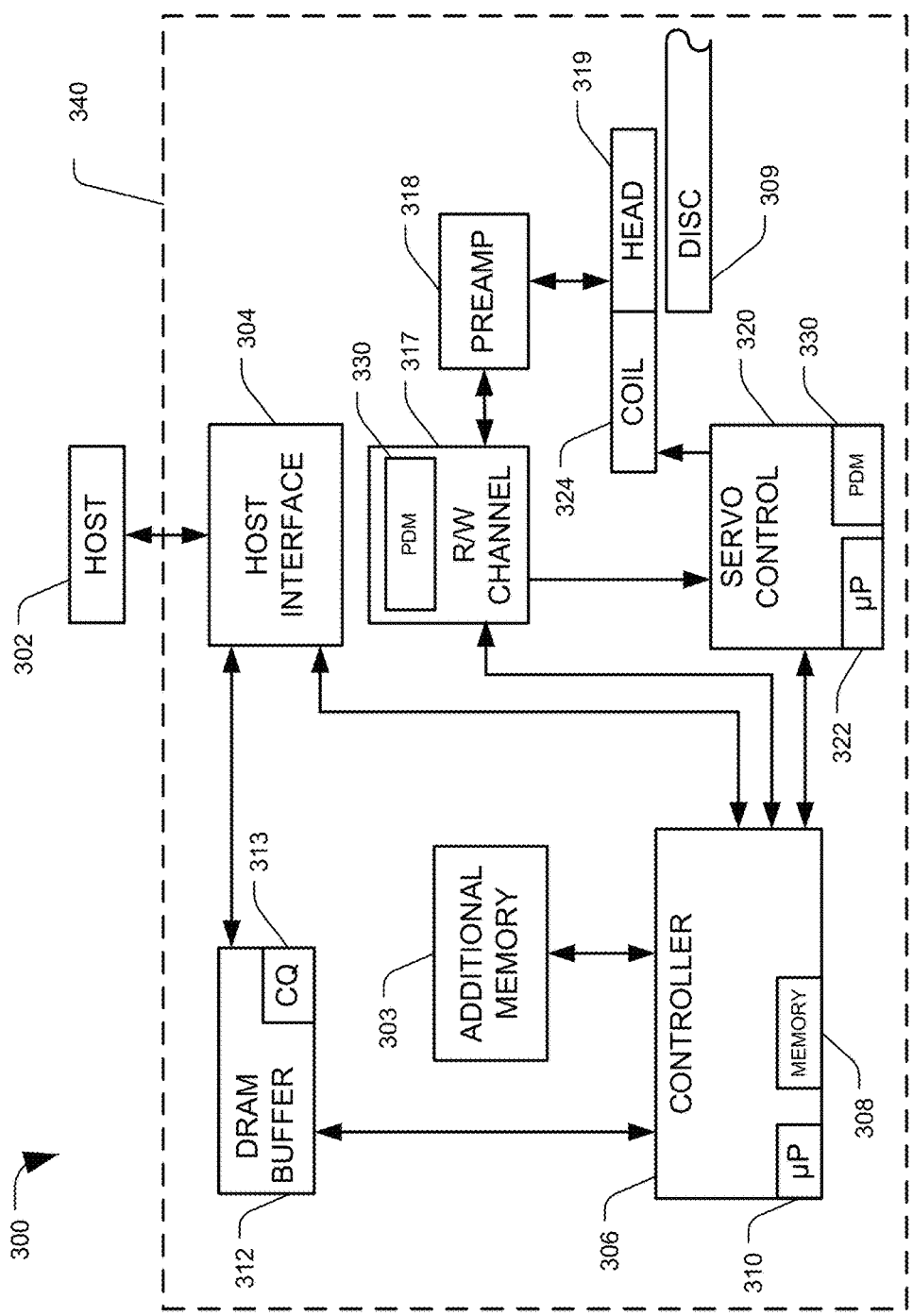
FIG. 3 is a diagram of a system configured to perform preamble detection and frequency offset determination, in accordance with certain embodiments of the present disclosure.

FIG. 3 is a diagram of a system configured to perform preamble detection and frequency offset estimation, generally designated 300, in accordance with certain embodiments of the present disclosure. Specifically, FIG. 3 provides a functional block diagram of an example data storage device (DSD) 300. The DSD 300 can communicate with a host device 302 (such as the host system 202 shown in FIG. 2) via a hardware or firmware-based interface circuit 304. The interface 304 may comprise any interface that allows communication between a host 302 and a DSD 300, either wired or wireless, such as USB, IEEE 1394, Compact Flash, SATA, eSATA, PATA, SCSI, SAS, PCIe, Fibre Channel, Ethernet, or Thunderbolt, among others. The interface 304 may include a connector (not shown) that allows the DSD 300 to be physically removed from the host 302. The DSD 300 may have a casing 340 housing the components of the DSD 300, or the components of the DSD 300 may be attached to the housing, or a combination thereof. The DSD 300 may communicate with the host 302 through the interface 304 over wired or wireless communication.

The buffer 312 can temporarily store data during read and write operations, and can include a command queue (CQ) 313 where multiple pending operations can be temporarily stored pending execution. Commands arriving over the interface 304 may automatically be received in the CQ 313 or may be stored there by controller 306, interface 304, or another component.

The DSD 300 can include a programmable controller 306, which can include associated memory 308 and processor 310. The controller 306 may control data access operations, such as reads and writes, to one or more disc memories 309. The DSD 300 may include an additional memory 303 instead of or in addition to disc memory 309. For example, additional memory 303 can be a solid state memory, which can be either volatile memory such as DRAM or SRAM, or non-volatile memory, such as NAND Flash memory. The additional memory 303 can function as a cache and store recently or frequently read or written data, or data likely to be read soon. Additional memory 303 may also function as main storage instead of or in addition to disc(s) 309. A DSD 300 containing multiple types of nonvolatile storage mediums, such as a disc(s) 309 and Flash 303, may be referred to as a hybrid storage device.

The DSD 300 can include a read-write (R/W) channel 317, which can encode data during write operations and reconstruct user data retrieved from a memory, such as disc(s) 309, during read operations. A preamplifier circuit (preamp) 318 can apply write currents to the head(s) 319 and provides pre-amplification of read-back signals. In some embodiments, the preamp 318 and head(s) 319 may be considered part of the R/W channel 317. A servo control circuit 320 may use servo data to provide the appropriate current to the coil 324, sometimes called a voice coil motor (VCM), to position the head(s) 319 over a desired area of the disc(s) 309. The controller 306 can communicate with a processor 322 to move the head(s) 319 to the desired locations on the disc(s) 309 during execution of various pending commands in the command queue 313. The DSD 300 may have two distinct channels for processing data sectors and servo sectors (e.g. a data channel and a servo channel), although in some embodiments a single channel may be used for both types of signal processing, or certain components may be shared by both channels. For example, the preamp 318 and R/W channel 317 may include components used when processing servo data, and the servo control 320 may also include components of the servo channel and perform servo signal processing.

DSD 300 may include a preamble detection module (PDM) 330. The PDM 330 may perform the methods and processes described herein to detect a selected signal pattern, and to determine a frequency offset of a sampling phase used to sample a signal. The PDM 330 may be a processor, controller, or other circuit, or it may be a set of software instructions that, when executed by a processing device, perform the functions of the PDM 330. In some embodiments, the PDM 330 may be part of or executed by R/W channel 317, part of or executed by servo control circuit 320, included in or performed by other components of the DSD 300, a stand-alone component, or any combination thereof. Additional details on a disc memory 209 and related signal processing are discussed in regard to FIG. 4.

Figure 4:
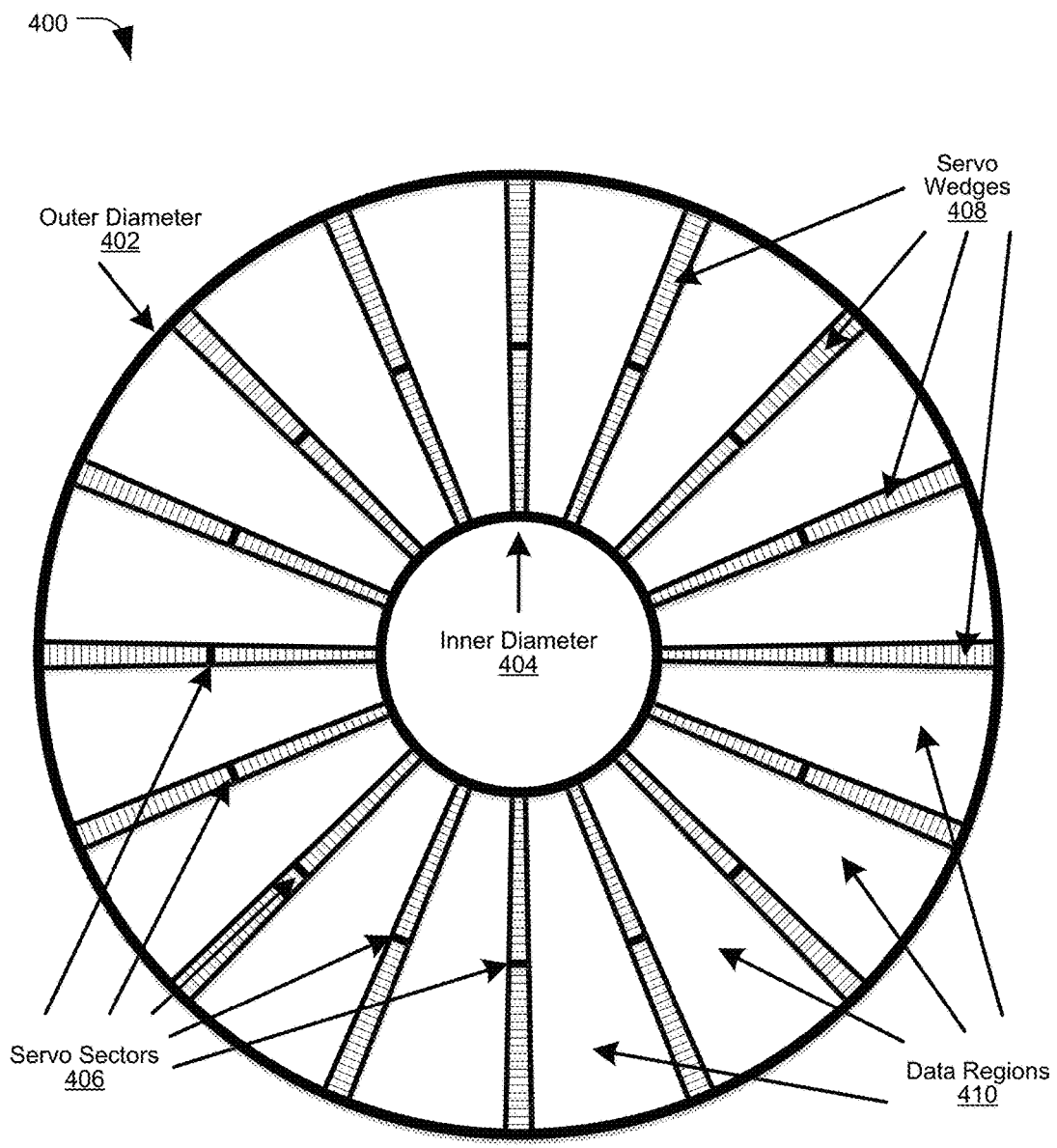
FIG. 4 is a diagram of a system configured to perform preamble detection and frequency offset determination, in accordance with certain embodiments of the present disclosure.

FIG. 4 is a diagram of a system configured to perform preamble detection and frequency offset estimation, in accordance with certain embodiments of the present disclosure. In particular, FIG. 4 depicts servo data recorded to a hard disc 400. The disc 400 may have data recorded to a multitude of concentric circular or spiral data tracks arranged from an outer diameter 402 to an inner diameter 404 of the disc 400. The disc 400 may spin about a central spindle located at the inner diameter 404. A read or write head may be positioned above the surface of the disc 404, and can read or write data to the tracks while the disc 400 spins below the head.

The storage and subsequent retrieval of data from a hard disc drive is made possible by the demodulation of a servo pattern which is written to the surface of each disk 400 during manufacturing. As shown in FIG. 4, the servo pattern may consist of a multitude of radially-oriented servo wedges 408 oriented from the inner diameter 404 to the outer diameter 402, and spaced evenly about the circumference of the disc 400. Each servo wedge 408 can include a plurality of servo sectors 406. The servo sectors 406 may define concentrically written servo tracks, where each servo track is comprised of a multitude of servo sectors 406 written at an (approximately) equal radius and spaced uniformly around the disk (e.g. a servo track may be composed of all sectors with an equivalent track ID (TID)). An example servo track may be defined by the servo sectors 406 shaded black in FIG. 4, all at approximately the same radial distance from the center of the disc 400. Data is stored to portions of concentric data tracks in the data regions 410 located between each servo wedge 408. However, servo tracks may not directly correspond to the concentric data tracks in which user data may be stored, and there may not be one servo track for each data track. While the disc 400 spins below a read head, the head may follow a servo or data track and detect a recurrent sequence of a servo sector 406 followed by one or more data sectors within the data region 410, followed by another servo sector 406 and so on.

Figure 5:
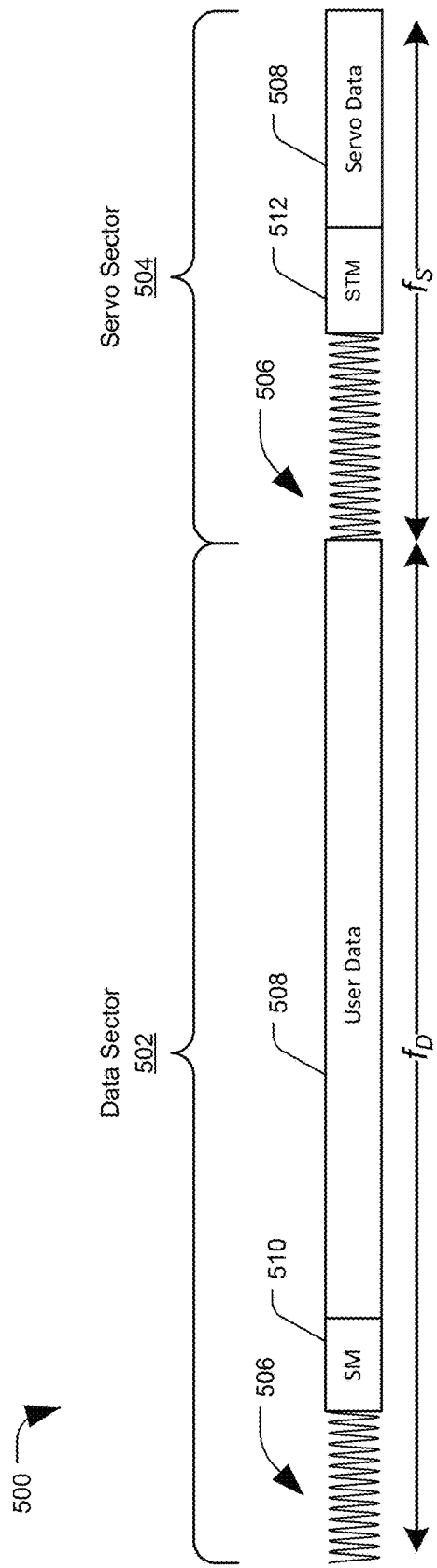
FIG. 5 is a diagram of a system configured to perform preamble detection and frequency offset determination, in accordance with certain embodiments of the present disclosure.

The data contained within each servo sector 406 specifies its physical radial and tangential locations. As the read head passes over each servo sector 406, the servo sector's information is demodulated such that the position of the read head is always known to the hard-disk controller (the position of the write-head may also be inferred). Furthermore, the spacing between servo sectors 406 can be utilized to modulate the frequency of clocks used for all write and read operations such that the frequencies remain consistent relative to the rotational velocity of the disc 400. It is this processing of the servo pattern which allows for consistent writes and reliable reads from a hard disc drive. FIG. 5 provides an example depiction of a portion of a track of the disc 400.

FIG. 5 is a diagram of a system configured to perform preamble detection and frequency offset estimation, in accordance with certain embodiments of the present disclosure. In particular, FIG. 5 depicts a portion of an example track 500 of a hard disc.

A track 500 may include alternating data sectors 502 and servo sectors 504. Although a single data sector 502 is depicted in FIG. 5, in some implementations there may be multiple data sectors 502, or even fractions or 'fragments' of a data sector 502, between each servo sector 504. Each whole sector or fragment may begin or be preceded by a preamble 506, which may be a predefined or selected data pattern that can be recognized to indicate the beginning of a sector. Different types of sectors (e.g. data and servo) may include have preambles 506 with distinguishable features, such as different frequencies, allowing the DSD to search for a particular type of sector or preamble. Once a preamble 506 is detected by a DSD, the DSD may look for a sync mark 510 or servo timing mark 512. Following the sync mark 510 or servo timing mark 512 may be a data portion 508 of a sector. For a data sector 502, the data portion 508 may be used to store user data, metadata, or other information. The data portion 508 of the servo sector 504 may include information identifying a location of the servo sector 504, and other information used to center a head or otherwise notify or influence the servo control system.

Data sectors 502 and servo sectors 504, including their respective preambles 506, may be written at different frequencies f. For example, servo sectors 504 may be recorded at a lower frequency $f_S$ relative to the data sector 502 in order to enable easier detection and reading of the servo data, which may be vital to the functioning of the storage device. Data sectors 502 may be recorded at a higher frequency $f_D$ in order to store more data to each track. Data should be read back from the sectors at the correct frequency to accurately detect the correct signal pattern.

At certain times in the operation of a hard disc drive the relative location of the read head to the next written servo sector is unknown. This would be the case, for example, when the disc first spins-up or when the active read head is changed. Here, the hard disc controller may configure a servo demodulation subsystem into a search mode, in which an attempt is made to locate the position of any servo sector 504. Locating the position of a servo sector 504 may be accomplished by detecting the servo timing mark 512, a known pattern written into all the servo sectors 504. Once a servo sector 504 is located, the controller may infer the location of subsequent servo sectors 504 and, thus, search mode may be successfully exited.

The operation of servo search mode can be of critical importance to the operation of a hard disc drive. Data may not be accurately written or read from an HDD until synchronization with the written servo pattern is achieved. Additionally, search mode may need to be re-entered any time this synchronization is lost. As such, it may be important that the operation of servo search mode be able to locate the position of a servo timing mark 512 as quickly and accurately as possible. Accurate detection and reading of servo sectors can greatly improve the performance and reliability of a DSD.

In order to accurately detect and read the servo sectors 504, a device may employ a methodology, for example via a preamble detection module (PDM), which is able to effectively locate the position of a servo sector 504 with a probability of false detection which can be made arbitrarily low through a selection of parameters. The methodology may be comprised of a preamble detection component to locate a servo preamble, and a frequency offset determination component to improve the reliability of data read procedures on the servo sector.

In regards to the preamble detection component, all servo sectors 504 may be preceded by a preamble pattern 506. The preamble pattern 506 may be a written data pattern which, due to inter-symbol interference, produces a sine-wave-like readback signal. The preamble pattern 506 can be used by the servo channel to synchronize its sampling phase and, in some cases, adjust the signal gain. The preamble detection method can compute, given a sequence of analog to digital converter (ADC) samples, a metric which is indicative of whether those samples were generated from a preamble readback signal. This metric can be robust to frequency offsets, have a low probability of false detection, and be amenable to implementation in hardware. In some embodiments, an affirmative preamble detection can trigger a search for a servo timing mark 512.

The methodology also includes the frequency offset determination component. The procedure utilized for preamble detection is robust to frequency offsets, which can be important as the frequency of the sampling clock may not be synchronized with the rotational velocity of the disk in search mode. The number of clock cycles between adjacent servo timing marks 512 can be used to achieve synchronization, which is not a possibility in search mode because the location of servo timing marks has not been determined yet. The ensuing search for a servo timing mark 512, however, may not be robust to frequency offsets, particularly considering that frequency offsets in excess of 2% are not uncommon in search mode. However, the procedure described herein provides a method for estimation of the offset of the sampling frequency from its expected value for the detected preamble. This estimate can be used directly to synchronize the sampling frequency to the rotational velocity of the disk, which in turn improves the capacity to accurately detect the servo timing mark 512 and the servo sector.

As described above, although some of the examples being discussed are in the context of a servo identification method, the techniques described are not limited to this embodiment. Detecting the presence of a single tone (e.g. sine-wave) embedded into a sequence of written or transmitted data is an operation that can be conducted by digital receivers. The described systems and methods may be utilized in any application that utilizes such functionality.

Figure 6:
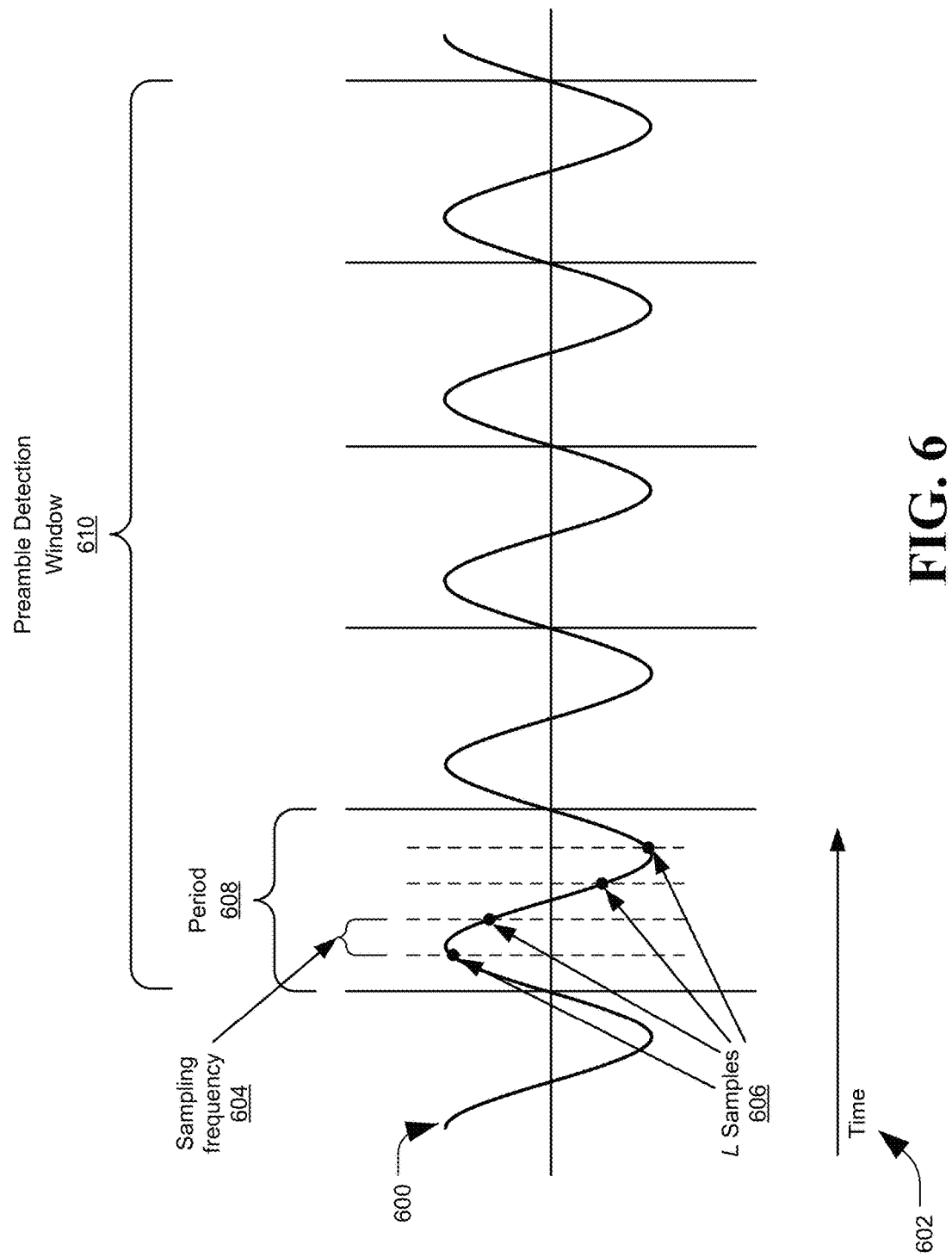
FIG. 6 is a diagram of a sampled signal for performing preamble detection and frequency offset determination, in accordance with certain embodiments of the present disclosure.

Turning now to FIG. 6, a diagram of a signal pattern 600 is depicted, in accordance with certain embodiments of the present disclosure. A procedure for sampling the signal 600 to obtain sample values is described. Signal pattern 600 may be received at an ADC in the form of a continuous voltage quantity received over a time period 602. The ADC may "sample" the signal 600 to obtain sample values 606 representing the state of the signal 600 at the point in time when the signal 600 was sampled. The sampling frequency at which the ADC samples the signal 600 may be controlled by a clock or timing signal provided to the ADC. Each dashed line may represent a clock signal triggering a sampling by the ADC, with the black dots representing the sample points 606 and values.

The method for detecting a preamble may include generating a metric from a sequence of ADC samples 606 which may be used to determine if the samples 606 are, indeed, samples of a preamble sequence. This may be accomplished by grouping sets of sample values, and determining error values for each group representing a deviation of the samples from an expected signal pattern of a preamble. If the error value for a group is lower than a threshold value, then a determination may be made that the samples from that group correspond to the expected preamble signal pattern. Enough groups or samples resulting in error values below the threshold may indicate that a preamble has been located and reduce the risk of false positives. For example, three consecutive groups may indicate a preamble. In another example, a sufficient proportion (e.g. 3 out of 4) of the most-recently evaluated groups having error values below the threshold may indicate a preamble.

The process may involve sampling the signal. The length or duration of the period of the pattern which is being sought (e.g. a preamble sine-wave) may be known to the device performing the operation. Here, it may be assumed that the sampling frequency be set such that, to within a small degree of error caused by a frequency offset, an integer number (L) of samples 606 are collected per period or cycle 608 of the expected preamble sine-wave. The samples 606 may be grouped into M periods 608 of the sine-wave, the collection of which can be denoted as, $$x=[x_0^0, x_1^0, \ldots, x_{L-1}^0, x_0^1, x_1^1, \ldots, x_0^{M-1}, x_1^{M-1}, \ldots, x_{L-1}^{M-1}], \quad (1)$$

where the superscript indicates the period 608 and the subscript the sample 606 within the period 608. Although sets of L samples 606 are grouped by a sine-wave period M608 for the purposes of description provided herein, other signal segments besides a period 608 may be used (e.g. L samples collected over a signal segment of three periods, or over fractions of periods). The M sets of L samples depicted in (1) may be collectively referred to as a detection window or preamble detection window 610. Phrased another way, a detection window may represent a selected number of samples obtainable within a set number of periods of the selected signal pattern, where the length of a period (and correspondingly a number of samples which can be obtained within a period) of the preamble is a known value to the system. As an example, with L=4 samples per period, a preamble detection window may be 16, 32, or 64 samples long for windows including 4, 8, or 16 periods. An example method for detecting a preamble based on sets of samples is described in regard to FIG. 7.

Figure 7:
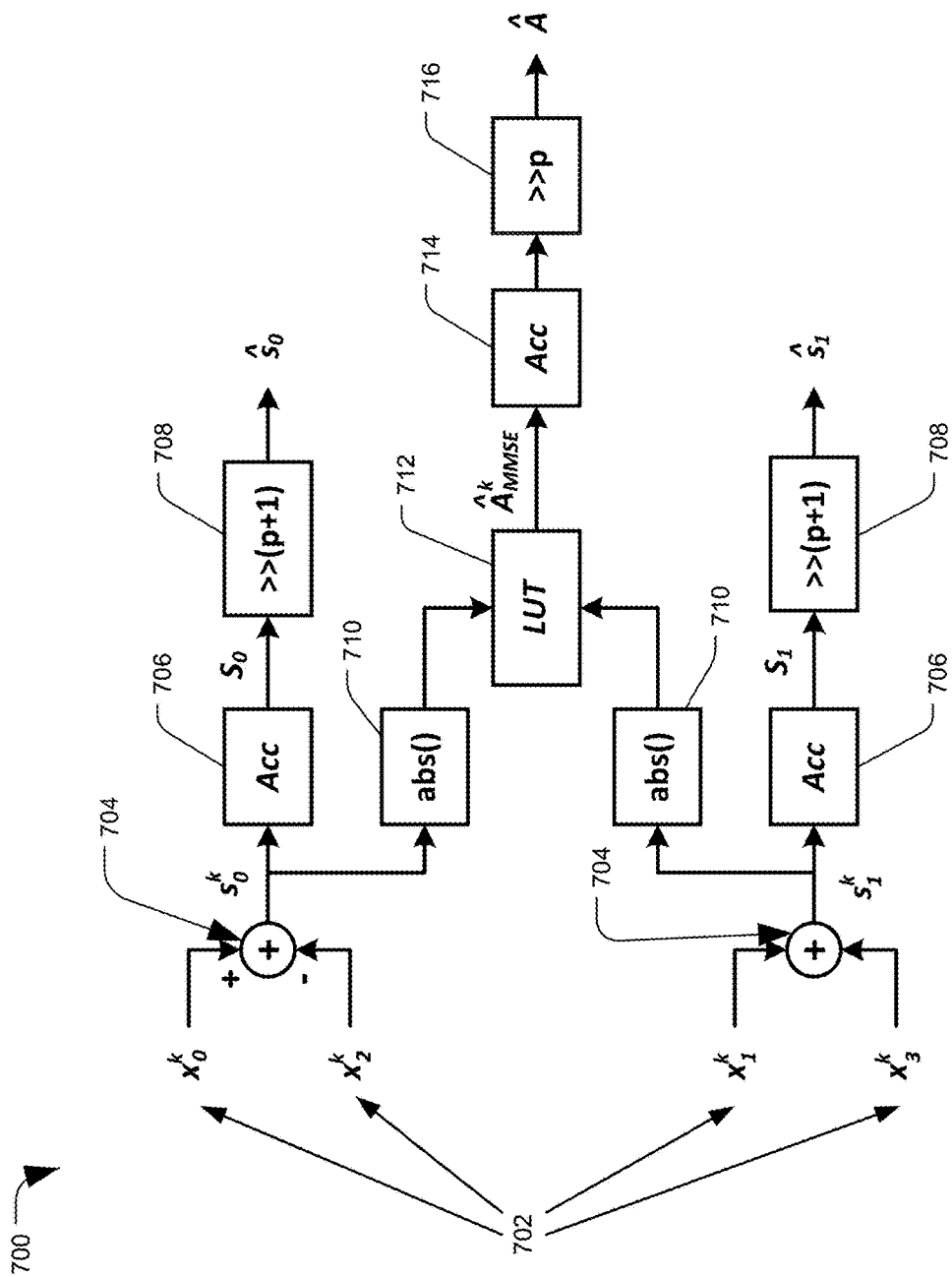
FIG. 7 is a diagram of a system configured to perform preamble detection and frequency offset determination, in accordance with certain embodiments of the present disclosure.

FIG. 7 depicts an example block diagram 700 which may be used to compute the value of metrics used to detect a preamble. The method may be performed based on a set of L samples collected per M periods (or other-sized signal segments), as described in regards to FIG. 6. As described above, the values $x_m^k$ represent samples 702 collected within a period of a signal, with the superscript k representing the period, and the subscript m representing the sample within the period.

Assuming these samples 702 are from an underlying sine-wave pattern (e.g. a selected signal pattern such as a preamble), and because they are evenly spaced across the signal's expected period, we may express the samples 702 from a single cycle of the preamble pattern in terms of an (unknown) amplitude (A) and (unknown) phase (θ) as, $$x_m^k = A\sin\left(\theta + m \times \frac{2\pi}{L}\right), m = 0, 1, 2, \ldots, L-1. \quad (2)$$

In an example scenario, the preamble is sampled L=4 times per period, in which the samples 702 may be expressed as, $$x_0^k \approx A\sin(\theta) = A\sin(\theta) \quad (3)$$

$$x_1^k \approx A\sin\left(\theta + \frac{\pi}{2}\right) = A\cos(\theta)$$

$$x_2^k \approx A\sin(\theta + \pi) = -A\sin(\theta)$$

-continued $$x_3^k \approx A\sin\left(\theta + \frac{3\pi}{2}\right) = -A\cos(\theta).$$

The expression in (3) is a model of what would be expected if the samples were actually obtained from a preamble, rather than non-preamble signal patterns. Here, it can be seen the even samples are of equal magnitude and opposite polarity, as are the odd samples. The samples 702 can be combined 704 into their even and odd sums as, $$s_0^k = (x_0^k - x_2^k) \approx 2A\sin(\theta)$$

$$s_1^k = (x_1^k - x_3^k) \approx 2A\cos(\theta). \quad (4)$$

If the samples in (4) were not from a preamble, they would be essentially random values and the summations would tend to go to zero instead. However, when the samples are from a preamble, taking advantage of the periodicity of the waveform, an average across all periods represented in the samples 702 (e.g. the averages for the preamble detection window including M sets of L samples each) can be determined as, $$S_0 = \sum_{k=0}^{M-1} s_0^k \approx 2M \times A\sin(\theta) \quad (5)$$

$$S_1 = \sum_{k=0}^{M-1} s_1^k \approx 2M \times A\cos(\theta).$$

The averages $S_0$ and $S_1$ can be computed via accumulators 706.

Next, estimates of each of the samples being considered can be obtained by dividing $S_0$ and $S_1$ by 2M. For the purposes of reducing hardware complexity, M may be chosen as 2P, (where p=log 2(M)), in which case this division may be accomplished using only a logical right shift operation 708 by (p+1), e.g., $$\hat{s}_0 = (S_0 >> (p+1)) \approx A\sin(\theta)$$

$$\hat{s}_1 = (S_1 >> (p+1)) \approx A\cos(\theta). \quad (6)$$

Error values may be determined for each sample within a period based on a difference between the sample values and the respective even or odd sample averages across the preamble detection window. The deviation of the received samples 702 from the expected sine-wave pattern (e.g. the error values) can be computed as, $$e_0^k = (x_0^k - \hat{s}_0)$$

$$e_1^k = (x_1^k - \hat{s}_1)$$

$$e_2^k = (x_2^k + \hat{s}_0)$$

$$e_3^k = (x_3^k + \hat{s}_1) \quad (7)$$

If the samples 702 are from a preamble pattern, the approximations given by (3) and (6) will hold and, thus, the errors given by (7) will be small in magnitude. If, however, the samples 702 are not from a preamble sequence (e.g. they are from an arbitrary data pattern), the sums $S_0$ and $S_1$ should average toward 0 as the length of the sums are increased and, therefore, we expect larger magnitude errors given by (7). One potential issue with this line of reasoning is that the magnitude of the errors may be dependent on the amplitude of the signal, regardless whether the samples 702 are from a preamble or not. As such, the disparity of the error magnitudes between the preamble and non-preamble cases may become smaller as the signal amplitude is reduced.

To address this issue, the amplitude of the signal can be incorporated into the preamble estimation. For a preamble sampled L=4 times per period, it can be shown (the derivation is omitted here) that the minimum mean-squared error (MMSE) estimate of the sine-wave amplitude is generated from its samples as, $$\hat{A}_{MMSE}^k = \frac{1}{2}\sqrt{(x_0^k - x_2^k)^2 + (x_1^k - x_3^k)^2}. \quad (8)$$

This computation may be easily carried out in hardware using a look-up table (LUT) 712, which can be indexed into by $|x_0^k-x_2^k|$ and $|x_1^k-x_3^k|$ (e.g. the absolute values (abs( )) 710 of $s_0^k$ and $s_1^k$). The merit in utilizing (8) for amplitude estimation is that, even if the samples 702 are not that of a preamble, the amplitude estimate is still scaled by the signal amplitude. For example, it should be clear that, if the samples 702 are multiplied by 2, the resulting amplitude estimate will also be multiplied by 2, regardless of the underlying signal.

An average of these amplitude estimates over the considered preamble cycles can be determined as, $$\hat{A} = \left(\left(\sum_{k=0}^{M-1} \hat{A}_{MMSE}^k\right) \gg p\right). \quad (9)$$

The summation of $\hat{A}_{MMSE}^k$ may be performed by accumulator 714, and a logical right shift 716 by p (where p=log 2(M)) may provide the value of $\hat{A}$.

Figure 8:
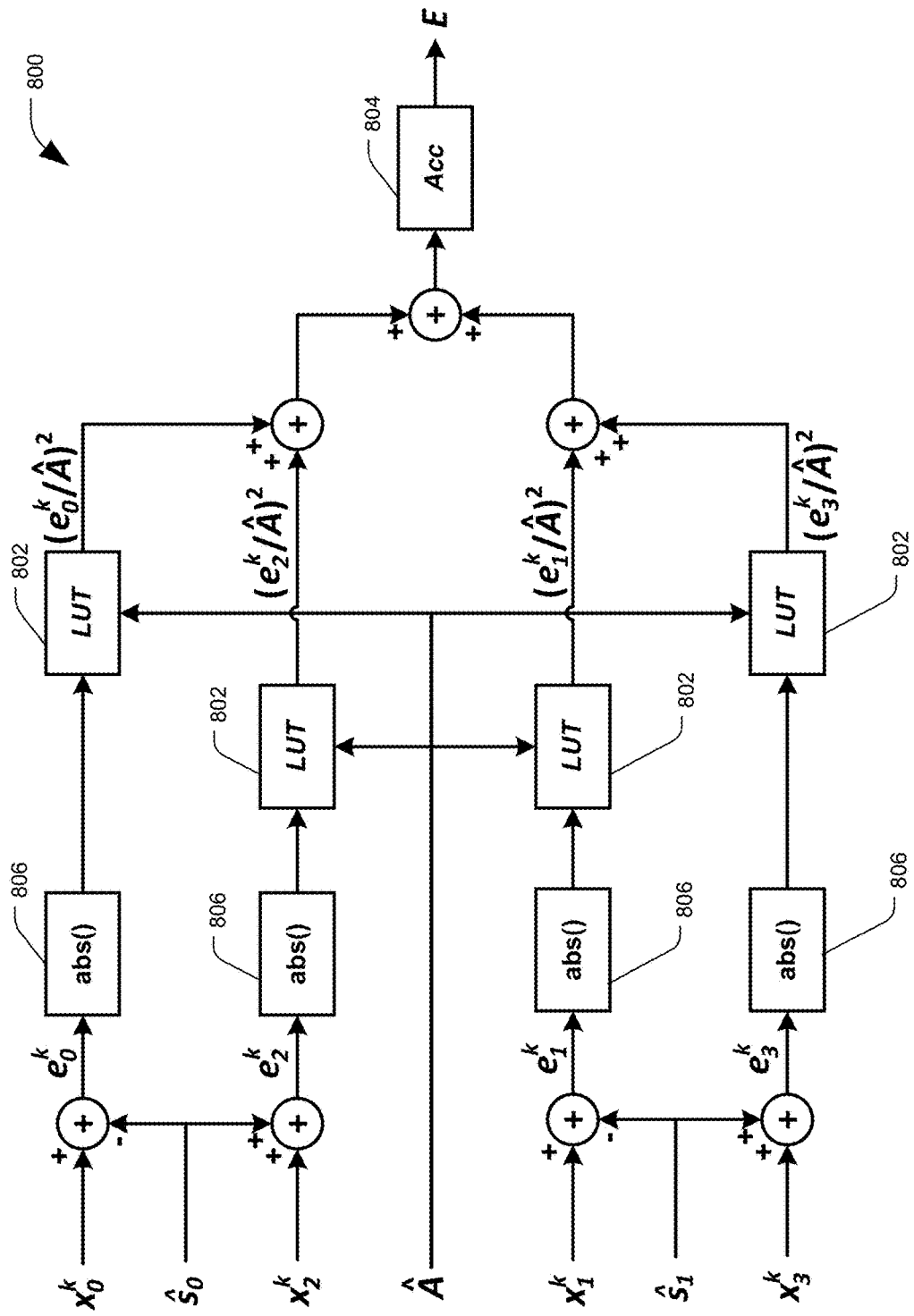
FIG. 8 is a diagram of a system configured to perform preamble detection and frequency offset determination, in accordance with certain embodiments of the present disclosure.

FIG. 8 depicts an example block diagram 800 which may be used to compute the value of a metric E. The metric E, which may represent an error value metric for a given preamble detection window, can be used for preamble detection. The value of E can be generated from the error values (7) and the amplitude estimate (9) as, $$E = \sum_{k=0}^{M-1}\left(\left(\frac{e_0^k}{\hat{A}}\right)^2 + \left(\frac{e_1^k}{\hat{A}}\right)^2 + \left(\frac{e_2^k}{\hat{A}}\right)^2 + \left(\frac{e_3^k}{\hat{A}}\right)^2\right). \quad (10)$$

As shown in FIG. 8, each of the terms given in (10) may be computed using a lookup table (LUT) 802 with the absolute values 806 $|e_j^k|$ and $|\hat{A}|$ as inputs and, summed at accumulator 804. If desired, E may be easily normalized by the preamble detection window length using a logical right shift by p. This error value E can be compared to a threshold to decide whether the samples x are from a written preamble sequence. If the value of E is below the threshold, the error may indicate that there is not significant deviation between the sampled values and expected values for the selected signal pattern (e.g. a sine-wave preamble pattern). If the error value E is greater than the threshold, the samples are unlikely to correspond to the expected signal pattern.

Although all of the previous discussion has focused on the example of a preamble which is sampled L=4 times per cycle, it may be easily generalized to any value of L. For example, for L=6, the samples for a single cycle may be written as, $$x_0^k \approx A\sin(\theta) = A\sin(\theta) \quad (11)$$

$$x_1^k \approx A\sin\left(\theta + \frac{\pi}{3}\right) = A\sin\left(\theta + \frac{\pi}{3}\right)$$

$$x_2^k \approx A\sin\left(\theta + \frac{2\pi}{3}\right) = A\sin\left(\theta + \frac{2\pi}{3}\right)$$

$$x_3^k \approx A\sin(\theta + \pi) = -A\sin(\theta)$$

$$x_4^k \approx A\sin\left(\theta + \frac{4\pi}{3}\right) = -A\sin\left(\theta + \frac{\pi}{3}\right)$$

$$x_5^k \approx A\sin\left(\theta + \frac{5\pi}{3}\right) = -A\sin\left(\theta + \frac{2\pi}{3}\right),$$

from which the following 3 sums may be computed, $$s_0^k = (x_0^k - x_3^k) \approx 2A\sin(\theta)$$

$$s_1^k = (x_1^k - x_4^k) \approx 2A\sin(\theta + \pi/3)$$

$$s_2^k = (x_2^k - x_5^k) \approx 2A\sin(\theta + 2\pi/3), \quad (12)$$

and averaged over all considered cycles to produce, $$\hat{s}_0 = \left(\sum_{k=0}^{L-1}(x_0^k - x_3^k) \gg (p+1)\right) \approx A\sin(\theta) \quad (13)$$

$$\hat{s}_1 = \left(\sum_{k=0}^{L-1}(x_1^k - x_4^k) \gg (p+1)\right) \approx A\sin(\theta + \pi/3)$$

$$\hat{s}_2 = \left(\sum_{k=0}^{L-1}(x_2^k - x_5^k) \gg (p+1)\right) \approx A\sin(\theta + 2\pi/3).$$

The errors for each of the samples over the 6T cycle can similarly be computed as their deviations from the averages computed in (13) as, $$e_0^k = (x_0^k - \hat{s}_0)$$

$$e_1^k = (x_1^k - \hat{s}_1)$$

$$e_2^k = (x_2^k - \hat{s}_2)$$

$$e_3^k = (x_3^k + \hat{s}_0). \quad (14)$$

$$e_4^k = (x_4^k + \hat{s}_1)$$

$$e_5^k = (x_5^k + \hat{s}_2)$$

Although the derivation is omitted here, the minimum mean-squared error (MMSE) estimate of the amplitude for cycle k may be computed as, $$\hat{A}_{MMSE} = \quad (15)$$

$$\frac{1}{2}\sqrt{\left(\frac{2x_0^k + x_1^k - x_2^k - 2x_3^k - x_4^k + x_5^k}{3}\right)^2 + \left(\frac{x_1^k + x_2^k - x_4^k - x_5^k}{\sqrt{3}}\right)^2},$$

which can be averaged as given by (9) and used to compute E in a similar manner as conducted for L=4, $$E = \sum_{k=0}^{M-1}\left(\left(\frac{e_0^k}{\hat{A}}\right)^2 + \left(\frac{e_1^k}{\hat{A}}\right)^2 + \left(\frac{e_2^k}{\hat{A}}\right)^2 + \left(\frac{e_3^k}{\hat{A}}\right)^2 + \left(\frac{e_4^k}{\hat{A}}\right)^2 + \left(\frac{e_5^k}{\hat{A}}\right)^2\right). \quad (16)$$

As shown, the method for generating E given a set of ADC samples may be easily generalized to any integer number of samples per preamble period. If the sampling frequency does not produce an integer number of samples per period, interpolation may be used to achieve this condition.

The process of servo preamble detection acts to continually recompute values of E as new ADC samples become available and compares the generated values to a specified threshold (T). In some embodiments computing a single value of E less than T is enough to declare detection of the servo preamble, whereas in other embodiments multiple consecutive preamble detection windows (or a selected proportion of windows (e.g. "M out of N" windows) must generate values of E less than T for preamble to be detected. The method utilized and the size of the preamble detection windows considered can be chosen based on the preamble length and to achieve a desired tradeoff of the probability of misdetection and the probability of false detection.

In some embodiments, the act of detecting a servo preamble is enough to declare the location of a servo sector known and, thus, is a condition in which a servo search mode may be considered complete. In other embodiments, however, it is not until a servo timing mark (STM) is successfully detected that search mode may be exited. Although the described detection of preamble is robust to offsets in frequency, STM detection algorithms may not, generally, be as robust. However, a methodology is described below for estimating or determining the frequency offset present in the sampling clock. The estimated frequency offset value may, then, be used to modulate the sampling frequency, thus allowing for a more robust detection of an STM.

The frequency offset that is of interest in this context is the deviation of the sampling rate from its expected value, based on the estimated period of the preamble sine-wave. The actual time it takes to traverse a period of a given servo preamble may be slightly different from the "ideal" amount of time, due to eccentricities in a servo track relative to the center of the disc or other factors. For example, if it is expected that a preamble pattern is being sampled L=4 times per period, and it is actually being sampled 4.04 times per period, the sampling frequency offset is 1% relative to the written data pattern. The methodology presented here for frequency offset determination may rely on the successful detection of preamble, after which the samples that generated the affirmative detection can be used to estimate the observed frequency offset. For this, it is noted that a frequency offset exhibits itself as a linear change in sampling phase over time (e.g. the point along a sine-wave pattern at which a sample is taken each period may change approximately linearly over time due to frequency offset). As such, the method proposes dividing the preamble samples into Nw groups of Ns consecutive samples and, for each group, estimate the phase at which the preamble is being sampled. The groups of samples may correspond to the preamble detection windows used for preamble detection (e.g. M sets of L samples per group), or they may be different groupings of consecutive samples (e.g. the samples from two or more preamble detection windows may be combined into a single group, or the samples from a single preamble timing detection window may be split into multiple groups, etc.). The (discrete-time) derivative of the phase estimates for each group, appropriately unwrapped and summed, can provide an estimate of the observed frequency offset.

As stated in the previous section, the samples deemed to correspond to a servo preamble may be from one or from multiple preamble detection windows. For example, assume positive preamble detection requires three out of four consecutive preamble detection windows having low error value metrics. Four consecutive preamble detection windows indicating [Yes, Yes, No, Yes] on positive preamble detection may indicate a preamble is detected. The samples from all four preamble timing detection windows may be used for frequency offset estimation. Optionally, the samples from the third window indicating "No" may be discarded, with estimated phase changes over the discarded window being accounted for. In either event, the totality of the samples used for frequency offset estimation can be expressed as the vector x, $$x=[x_0^0,x_1^0,\ldots,x_{Ns-1}^0,x_0^1,x_1^1,\ldots,x_{Ns-1}^1,\ldots, x_0^{Nw-1},x_1^{Nw-1},\ldots,x_{Ns-1}^{Nw-1}], \quad (17)$$

where the superscript indicates the group number (e.g. the preamble detection window) and the subscript indicates the sample within the group. Here is it provided that Ns be a multiple of L or, equivalently, each grouping contains an integer number of cycles of the preamble.

Figure 9:
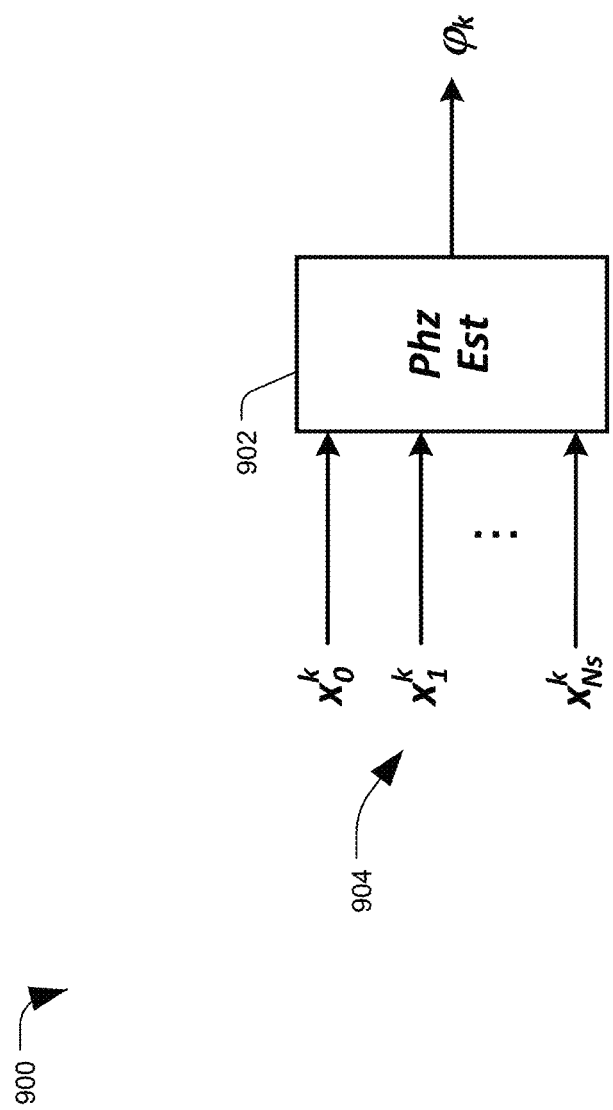
FIG. 9 is a diagram of a system configured to perform preamble detection and frequency offset determination, in accordance with certain embodiments of the present disclosure.

FIG. 9 depicts an example block diagram 900 of a process for obtaining a phase estimate based on a set of samples, according to certain embodiments of the present disclosure. FIG. 9 depicts that each grouping of samples 904 can be applied to a phase estimation algorithm or phase calculation module 902, which can produce an estimate of the sampling phase, $\varphi_k$ (PHI$_k$), for the portion of the preamble corresponding to the group of samples 904. There exist known methods of estimating the phase of a sine-wave given its samples and, therefore, discussion of the methods are omitted. Any phase estimation methods may be utilized for this operation.

Figure 10:
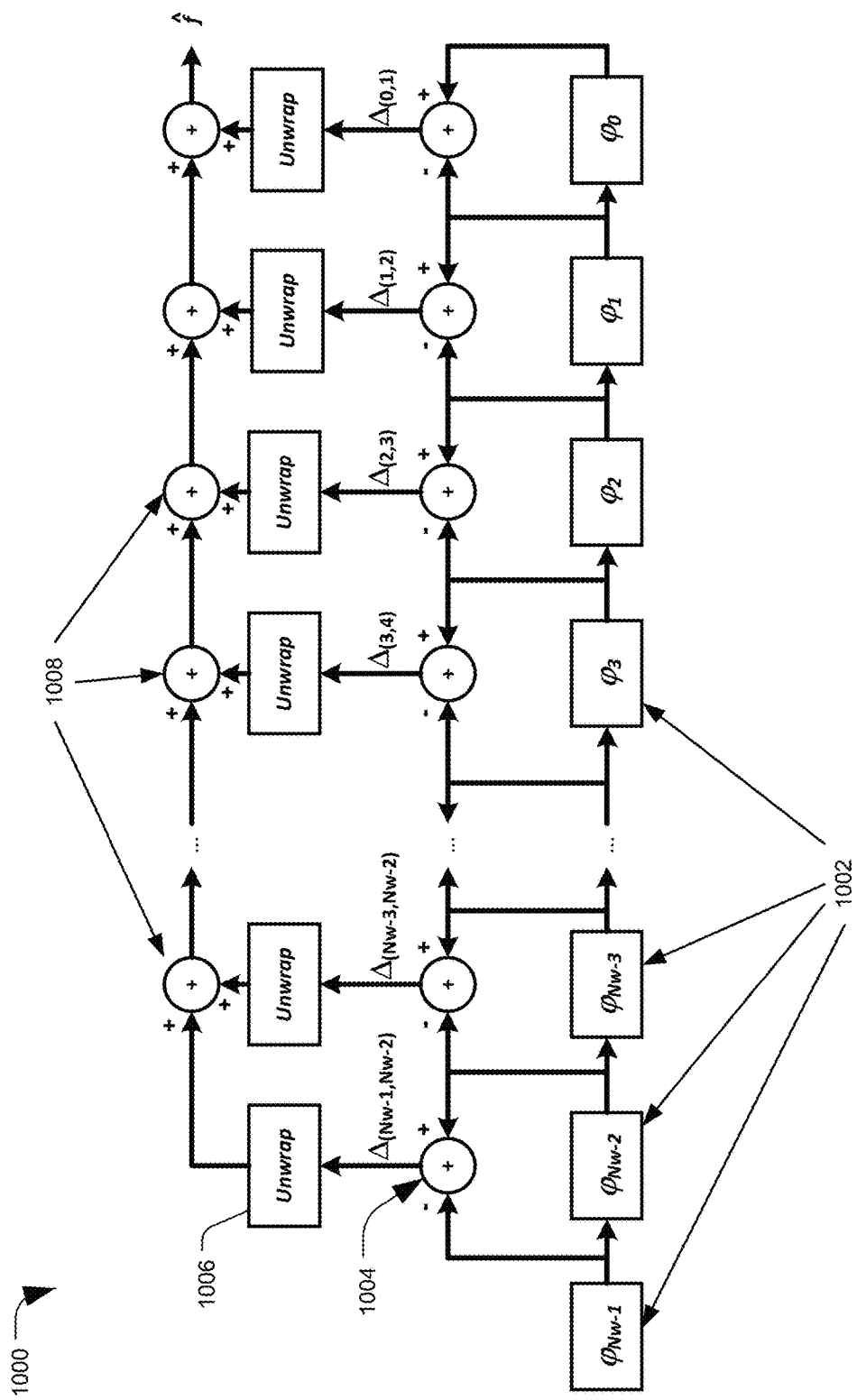
FIG. 10 is a diagram of a system configured to perform preamble detection and frequency offset determination, in accordance with certain embodiments of the present disclosure.

FIG. 10 depicts an example block diagram 1000 of the computation process for determining a frequency offset, according to certain embodiments of the present disclosure. Once phase estimates 1002 for the groups of samples are determined, the frequency offset of the current sampling frequency from the recorded frequency may be determined as depicted in diagram 1000. As shown, a difference 1004 may first be computed between each pair of temporally adjacent phase estimates 1002 as, $$\Delta_{(k,k-1)}=(\varphi_{k-1}-\varphi_k), \quad (18)$$

which can provide an estimate of the change in phase occurring over a period of Ns sampling intervals.

The phase differences may then be passed to a block 1006 which performs a phase unwrapping operation. Phase unwrapping is advantageous as adding and subtracting phases is prone to wrapping effects. For example, phases may be expressed as degrees from 0° to 360°. If a frequency offset is present in the signal sampling, the phase readings for each group of samples will ramp up or ramp down (e.g. 90°, 100°, 110°, etc.) over consecutive groups. "Wrapping" may occur when values "wrap around" from 0° to 360° (e.g. 17°, 7°, 357°) or vice-versa. Accurately measuring frequency offset may include properly identifying the magnitude of a phase shift despite the wrapping effects, and so unwrapping operations may be used to negate those effects.

As another example, if the phase is specified as a value in the range [0,2π], then there may exist a phase discontinuity between 0 and 2π (similarity, if the phase is specified as a value in the range [−π,π], there may exist a phase discontinuity between −π and π). To unwrap a phase difference it can be assumed that a phase jump no larger than π is expected (which would be equivalent to two sampling intervals for L=4 per period) and, thus, the phase estimates may be unwrapped as, $$\Delta_{(k,k-1)} = \begin{cases} (\Delta_{(k,k-1)} - 2\pi) & \text{for} \quad \Delta_{(k,k-1)} > \pi \\ (\Delta_{(k,k-1)} + 2\pi) & \text{for} \quad \Delta_{(k,k-1)} < -\pi \\ \Delta_{(k,k-1)} & \text{for} \quad |\Delta_{(k,k-1)}| \le \pi \end{cases} \quad (19)$$

The results of these unwrapping operations 1006 may be summed 1008 to generate the (un-normalized) frequency offset f̂. Optionally, the value f̂ may be divided by Nw (e.g. the number of groups of samples) to generate a normalized frequency offset. The normalized value of f̂ may be expressed as units of radians per sampling interval, whereas the units of the un-normalized frequency offset may be radians per Nw sampling intervals.

The determined frequency offset may then be used to modulate a sampling frequency used to sample the signal by adjusting a clock signal rate provided to the ADC. Modulating the sampling frequency to more closely match the frequency of the signal can improve accuracy in detecting values from the signal, which in turn can improve the ability to detect a sync mark or servo timing mark, and avoid false positives. Example methods for detecting preamble and determining frequency offset are discussed in regard to FIGS. 11 through 14. The methods of FIGS. 11 through 14 may be performed by a preamble detection module (PDM) and other channel components as described herein.

Figure 11:
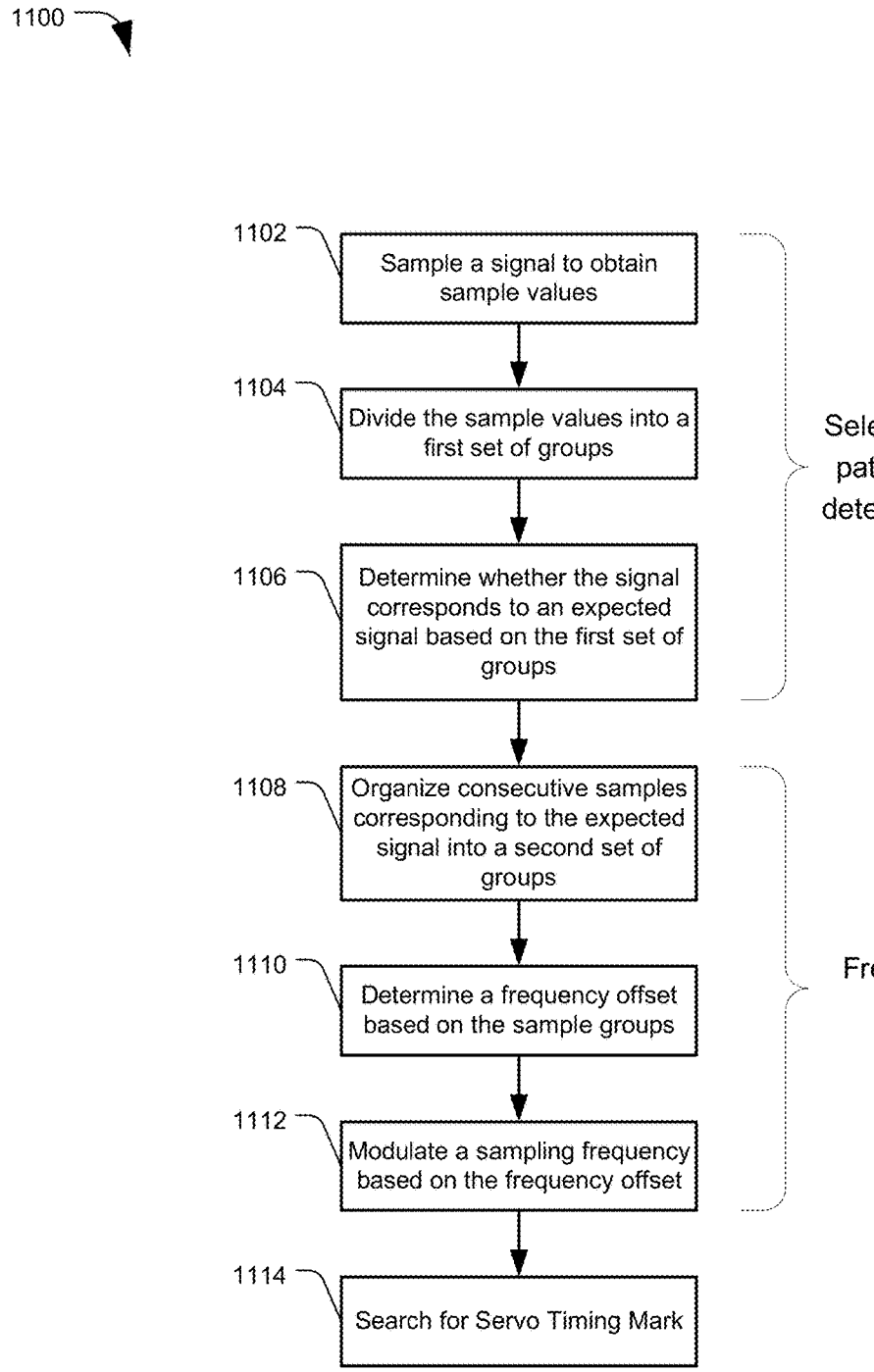
FIG. 11 is a flowchart of a method of preamble detection and frequency offset determination, in accordance with certain embodiments of the present disclosure.

FIG. 11 is a flowchart of an example method 1100 of preamble detection and frequency offset determination, in accordance with certain embodiments of the present disclosure. The method 1100 may correspond to a search mode performed at a receiving device to detect a selected or expected signal pattern within a received signal. The method 1100 may include selected pattern detection (e.g. for a preamble) in blocks 1102 to 1106, and frequency offset estimation in blocks 1108 to 1112.

The method 1100 may include sampling a signal to obtain sample values, at 1102. The sample values may be divided into a first set of groups, at 1104. For example, the first set of groups may correspond to preamble detection windows set based on a selected number of periods M of the selected signal pattern, with a set number of samples L obtained for each period. Accordingly, each group may consist of M×L samples corresponding to a preamble detection window.

The method 1100 may include determining whether the signal corresponds to the expected signal pattern based on the first set of groups, at 1106. Determining whether the signal corresponds to the expected signal pattern may include calculating an error value for each of the first groups, and determining whether the error value is lower than a threshold. If the error value is lower than the threshold, it may indicate that the group corresponds to the selected signal pattern. Determining that a selected number of groups in close proximity (e.g. consecutive, or a proportion of most-recently sampled groups) correspond to the selected signal pattern may result in a determination that the selected signal pattern has been identified.

For frequency offset estimation, the method 1100 may include organizing consecutive samples corresponding to the expected signal pattern into a second set of groups, at 1108. The second set of groups may correspond to the first set of groups, or the samples may be organized into groups of a different size. The samples may be retained in consecutive order within the second set of groups.

The method 1100 may include determining a frequency offset based on the sample groups, at 1110. For example, a phase estimation may be made for each group in the second set of groups. The differences in the phase estimation between consecutive groups may be unwrapped and averaged to determine a frequency offset. A sampling frequency may then be modulated based on the determined frequency offset, at 1112.

In some embodiments, the search mode may end when a preamble is detected. Optionally, the search mode method may include searching for a servo timing mark (STM) once the preamble is detected, at 1114. STM detection may continue until the STM is located, or until the signal samples indicate that the expected signal pattern is no longer detected.

Figure 12:
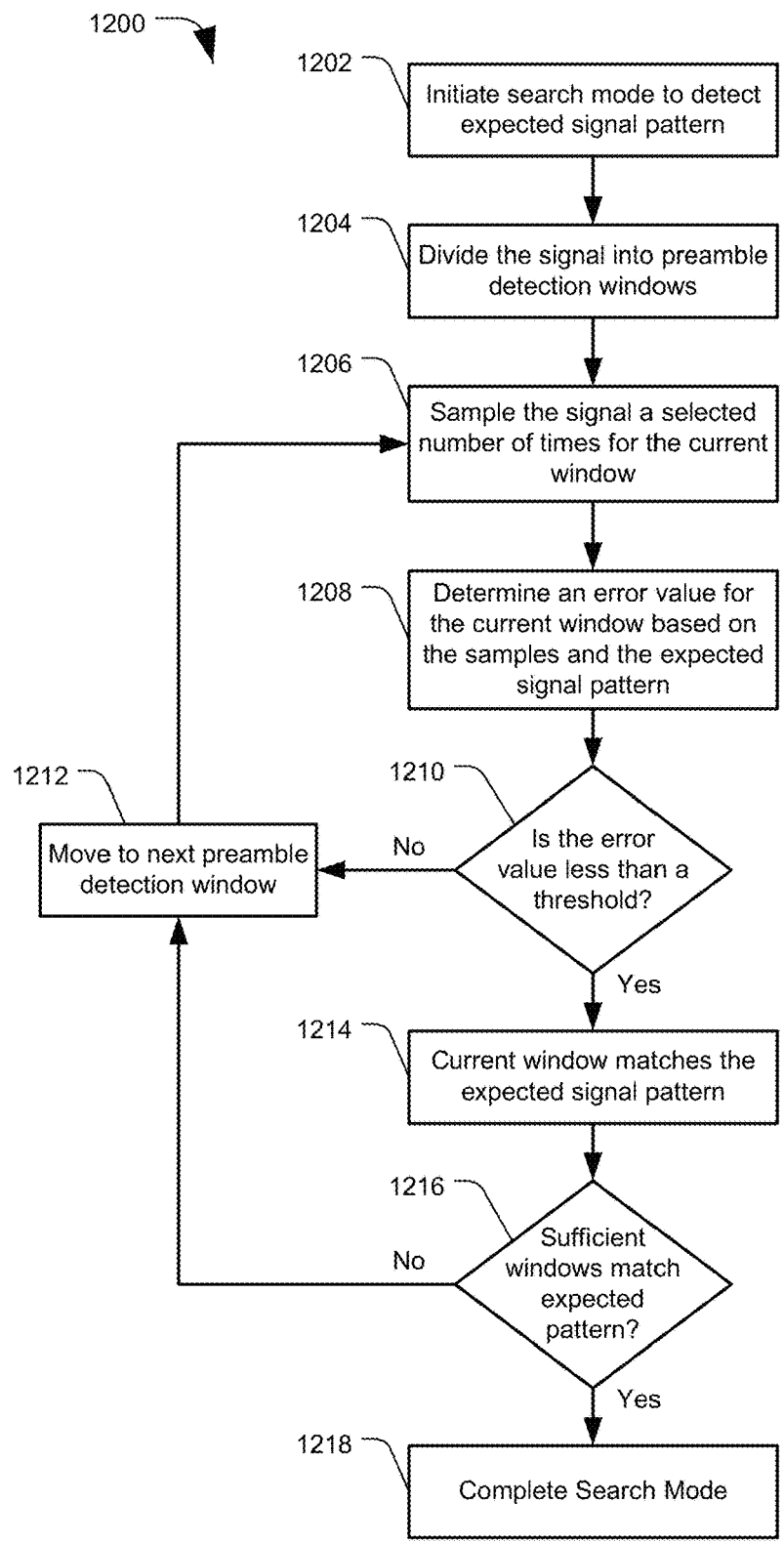
FIG. 12 is a flowchart of a method of preamble detection and frequency offset determination, in accordance with certain embodiments of the present disclosure.

FIG. 12 is a flowchart of an example method 1200 of preamble detection and frequency offset determination, in accordance with certain embodiments of the present disclosure. The method 1200 may correspond to a search mode performed at a receiving device to detect a selected or expected signal pattern within a received signal.

The method 1200 may include initiating a search mode to detect the expected signal pattern, at 1202. The signal may be divided into discrete preamble detection windows, at 1204. The length of the preamble detection windows (e.g. in number of samples obtained) may optionally be set based on a number of periods of the expected signal pattern, such that L samples are obtained for each of M periods. The signal may be sampled a selected number of times for the current preamble detection window, at 1206. For example, the signal may be sampled 4 times in each period at a set sampling frequency for M periods.

The method 1200 may include determining an error value for the current preamble detection window based on the samples and the expected signal pattern, at 1208. The error value may be based on the preamble detection window sample values and signal amplitude estimates, as discussed in regards to FIGS. 6 through 8. If samples from a period of the preamble detection window exhibit approximately equal magnitude and opposite polarity to other paired samples from the same period, a low error value may be produced. For example, if there are L=4 samples obtained during a period, sample 0 may have an approximately equal magnitude and opposite polarity to sample 2, and so on for sample 1 and sample 3. Similarly for L=6, sample 0 may have approximately equal magnitude and opposite polarity of sample 3, and similarly for samples 1 and 4, and samples 2 and 5. If the samples are not from the expected signal pattern, a larger error value may be produced.

The error value for the current preamble detection window may be compared against a threshold value, at 1210. The threshold value may be set high enough to detect the expected pattern despite irregularities and noise in the signal, but low enough to avoid common false identification of the expected pattern. If the error value is not lower than the threshold, the method 1200 may include proceeding to the next preamble detection window, at 1212, and sampling the signal for that window at 1206.

If the error value is lower than the threshold, at 1210, the method 1200 may include determining that the current preamble detection window matched the expected signal pattern, at 1214. A determination may be made whether sufficient preamble detection windows have matched the expected signal pattern, at 1216. With sufficient samples, a single preamble detection window may be used to identify the expected signal pattern. Alternately, a plurality of preamble detection windows with low error values may be required to detect the expected pattern. A selected number of consecutive windows (e.g. three) with a positive identification may be used, without any intervening windows having an error value above the threshold. In some embodiments, a proportion of a selected number of most-recently evaluated preamble detection windows may be used (e.g. out of the last four preamble detection windows, three must have an error value below the threshold to identify the selected pattern). If sufficient preamble detection windows do not match the pattern, at 1216, the method 1200 may include moving to the next window, at 1212. If sufficient preamble detection windows do match the expected pattern, the method 1200 may include determining that the expected pattern is detected and completing the search mode, at 1218. Completing search mode may optionally include determining a frequency offset, detecting a predefined signal pattern (e.g. a servo timing mark) after the selected signal pattern, or other processes. Preamble detection windows may be continually evaluated even after the expected pattern is detected, to determine whether the expected pattern (e.g. preamble) is subsequently lost.

Figure 13:
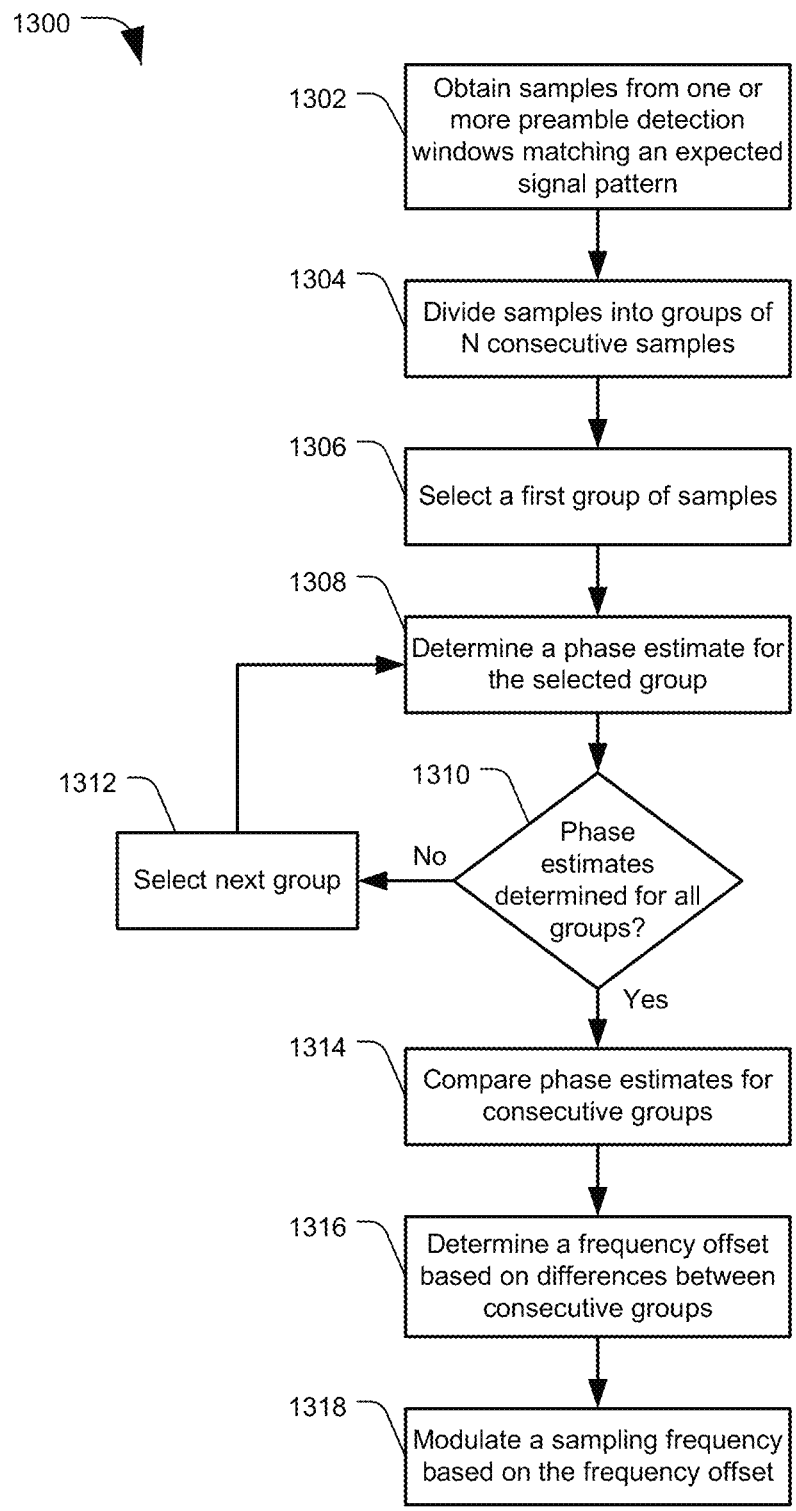
FIG. 13 is a flowchart of a method of preamble detection and frequency offset determination, in accordance with certain embodiments of the present disclosure.

FIG. 13 is a flowchart of an example method 1300 of preamble detection and frequency offset determination, in accordance with certain embodiments of the present disclosure. The method 1300 may correspond to a frequency offset determination performed at a signal receiving device to modulate a sampling frequency used to sample the signal.

The method 1300 may include obtaining samples from one or more preamble detection windows matching an expected signal pattern as described in method 1200, at 1302. The method 1300 may include dividing the samples into groups of N consecutive samples, at 1304. The groups may correspond to the preamble detection windows within which the samples were obtained, or the groups may be different. For example, the samples from three consecutive preamble detection windows may be included into a single group, or the samples from a single preamble detection window may be split into two groups.

A first group of samples may then be selected for evaluation, at 1306. A phase estimate may be determined for the selected group, at 1308, followed by a determination of whether phase estimates have been determined for all groups, or a selected number of groups, at 1310. For example, if six groups of samples were used to determine an expected signal pattern, a phase estimate may be obtained for all six groups before determining a frequency offset. Alternately, once a phase estimate has been made for a sufficient number of the six groups (e.g. at least a pair), further processing may be performed. If sufficient phase estimates have not been obtained, the method 1300 may include selecting the next group at 1312, and determining a phase estimate for that group at 1308.

When a sufficient number of groups have been evaluated for phase estimates, the method 1300 may include comparing phase estimates for each pair of consecutive groups, at 1314. For example, the phase estimates for group 1 and group 2 may be compared, followed by group 2 and group 3, then group 3 and group 4, etc. Method 1300 may also include comparing non-consecutive groups, such as every other group (e.g. group 1 and group 3, and group 2 and group 4, etc.). Comparison of the phase estimates may include determining a difference between the phase estimates for each pair of groups.

The method 1300 may include determining a frequency offset based on the differences between the phase estimates of consecutive groups, at 316. The existence of a frequency offset may manifest in an approximately linear change in the phase estimates between sample groups. In order to accurately track the phase changes, the differences between consecutive groups may be unwrapped, and the unwrapped differences between each pair of groups may be added to obtain a frequency offset value. The frequency offset value may then be used to modulate a sampling frequency, at 1318. For example, the frequency offset may be used to adjust a clock pulse frequency applied to an ADC to control a sampling rate.

Figure 14:
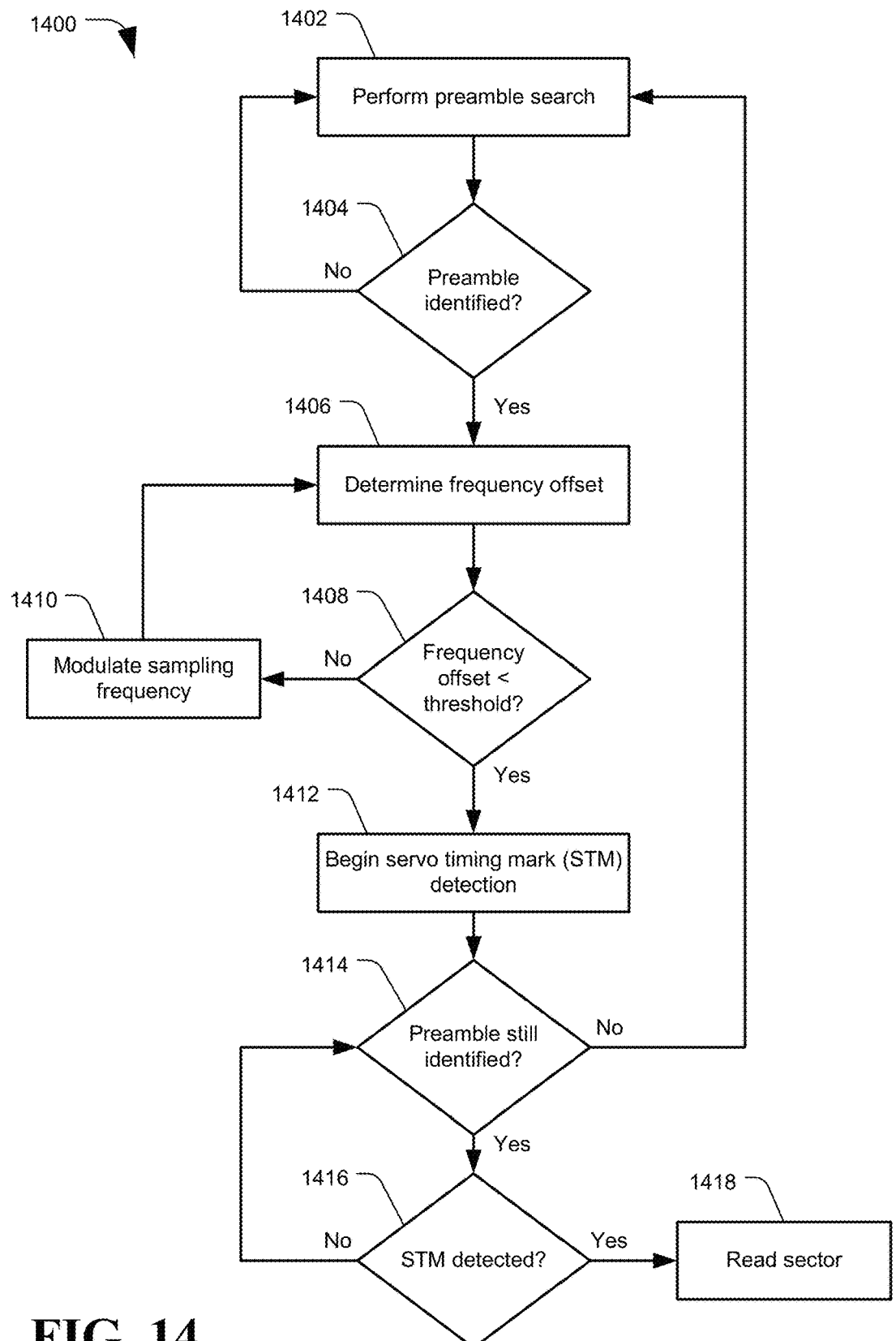
FIG. 14 is a flowchart of a method of preamble detection and frequency offset determination, in accordance with certain embodiments of the present disclosure.

FIG. 14 is a flowchart of an example method 1400 of preamble detection and frequency offset determination, in accordance with certain embodiments of the present disclosure. The method 1400 may depict a process of detecting a servo timing mark (STM) following the detection of a preamble signal.

The method 1400 may include performing a preamble search, at 1402, and determining whether a preamble was identified, at 1404, for example as described in regards to methods 1100 and 1200. If the preamble was not identified, the method 1400 may include continuing the preamble search at 1402. If the preamble was identified, the method 1400 may include determining a frequency offset, at 1406, for example as described in regards to methods 1100 and 1300.

The method 1400 may include determining whether the frequency offset is below a frequency offset threshold, at 1408. If the determined frequency is above the threshold, it may indicate that the frequency offset is severe enough that errors in detecting a bit pattern may arise, and risk misidentification of data from the read signal. Therefore if the frequency offset is above the threshold, searching for a servo timing mark may be delayed to avoid a false identification of the STM, while the preamble search continues to ensure the preamble has not been lost. When the frequency offset is not below the threshold, the method 1400 may include modulating the sampling frequency based on the frequency offset at 1410. Additional samples may be obtained at the modulated sampling frequency, and the newly obtained samples may be used to update or calculate a new frequency offset, at 1406.

If the frequency offset is below the frequency offset threshold, at 1408, the method 1400 may include beginning an STM detection operation, at 1412. The system may begin looking for a preset data pattern within the signal corresponding to the STM. A search window corresponding to a selected number of preamble signal cycles may be set in which to search for the STM. A determination may be made whether the preamble is still identified, at 1414. The STM should directly follow the preamble, so if the preamble pattern is lost before locating the STM, the STM search may be aborted (e.g. no further STM search windows may be set until a preamble is located again) and the preamble search continued, at 1402. If the preamble is still identified, at 1414, the method 1400 may include determining whether the STM is detected, at 1416. If the STM is not detected, the method 1400 may include continuing to verify that the preamble is still identified at 1414 while the STM search continues. As long as the preamble continues to be detected, the STM search window may be extended accordingly. If the STM is detected, at 1416, the method 1400 may include reading the servo sector, at 1418.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
   a data storage device including:
      a disc data storage medium;
      a data channel configured to:
         receive a signal representative of data stored on the disc data storage medium;
         perform a preamble search operation to detect a preamble signal pattern within the signal, including:
            sample the signal to obtain a selected number of samples corresponding to a detection window;
            determine an error value for the detection window based on values of the selected number of samples;
            detect the preamble signal pattern when a selected proportion of most-recently sampled detection windows have error values below a threshold value; and
         identify a head location relative to the disc data storage medium based on detecting the preamble signal pattern; and
         perform data access operations based on the head location.

2. The apparatus of claim 1 comprising the data channel further configured to:
   modulate a sampling frequency at which the signal is sampled, including:
      determine selected samples from detection windows having error values below the threshold value;
      calculate phase estimates representing a phase at which groups of the selected samples were sampled;
      determine a frequency offset based on the phase estimates; and
      modulate the sampling frequency according to the frequency offset.

3. The apparatus of claim 2 comprising the data channel further configured to:
   determine a phase estimate for each group of selected samples;
   compare the phase estimates for consecutive groups; and
   determine the frequency offset based on the results of the comparisons of the phase estimates of the consecutive groups.

4. The apparatus of claim 3 comprising the data channel further configured to:
   compare the phase estimates for the consecutive groups by determining a difference between the phase estimates for the consecutive groups; and
   determine the frequency offset based on a summation of the differences between the phase estimates for the consecutive groups.

5. The apparatus of claim 4 comprising the data channel further configured to:
   perform a phase unwrapping operation on the differences between the phase estimates to obtain an unwrapped phase difference; and
   determine the frequency offset based on a summation of the unwrapped phase differences.

6. The apparatus of claim 5 comprising the data channel further configured to:
   once the frequency offset is below a frequency offset threshold, search for a known pattern preceding a sector stored to the disc data storage medium, including:
      continue to detect the preamble signal pattern;
      perform the preamble search operation again in the event the preamble signal pattern is lost;
      identify the known pattern when the preamble signal pattern is not lost; and
      read data from the sector when the known pattern is identified.

7. The apparatus of claim 6 further comprising:
   the known pattern is a servo timing mark; and
   the sector is a servo sector.

8. The apparatus of claim 6 further comprising:
   the known pattern is a sync mark; and
   the sector is a data sector.

9. The apparatus of claim 6 comprising the data channel includes:
   an analog to digital converter (ADC) configured to sample the signal at the sampling frequency based on a clock signal;
   a preamble detection module configured to:
      determine the error value for each detection window;
      determine whether the preamble is detected based on the error values of each preamble detection window;
      calculate the phase estimates;
      determine the frequency offset;
      modulate the sampling frequency; and
   a clock signal generator configured to provide the clock signal to the ADC.

10. The apparatus of claim 9 comprising the preamble detection module further configured to modulate the sampling frequency using an interpolation filter applied to a clock signal.

11. An apparatus comprising:
    a data storage device having:
       a disc data storage medium;
       a data channel configured to:
          receive a signal representative of data stored on the disc data storage medium;
          modulate a sampling frequency at which the signal is sampled, including:
             sample the signal to obtain sample values corresponding to a preamble signal pattern of a sector of the disc data storage medium;
             organize the sample values into groups based on detection windows in which the sample values were obtained, a detection window representing a selected number of samples obtainable in a set number of periods of the preamble signal pattern;
             calculate phase estimates representing a phase at which the groups were sampled;
             determine a frequency offset based on the phase estimates, the frequency offset representing a deviation of a rate at which the signal is being sampled per period relative to an expected sampling rate;

modulate the sampling frequency according to the frequency offset to generate a modulated sampling frequency aligned with the expected sampling rate; and read the sector based on the modulated sampling frequency.

12. The apparatus of claim 11 comprising the data channel further configured to:

perform a preamble search operation to detect the preamble signal pattern within the signal, including:

determine an error value for each detection window based on values of the selected number of samples; and detect the preamble signal pattern when a threshold proportion of most-recently sampled detection windows have error values below a threshold value.

13. The apparatus of claim 12 comprising the data channel further configured to:

determine the error value for each detection window based on a deviation of the sample values from an expected waveform pattern of the preamble signal pattern.

14. The apparatus of claim 12 further comprising:

the data channel includes:

an analog to digital converter (ADC) configured to sample the signal at the sampling frequency based on a clock signal;

a clock signal generator configured to provide the clock signal to the ADC a preamble detection module configured to:

determine the error value for each detection window;

detect the preamble signal pattern based on the error values of each detection window;

calculate the phase estimates;

determine the frequency offset; and modulate the sampling frequency via modifying a rate of the clock signal produced by the clock signal generator.

15. The apparatus of claim 12 comprising the data channel further configured to:

determine the preamble signal pattern is detected;

continue to determine error values for detection windows after the preamble signal pattern is detected to determine when the preamble signal pattern is lost;

determine the frequency offset in response to detecting the preamble signal pattern;

search for a servo timing mark for a duration of a search window corresponding to a selected number of periods of the preamble signal pattern;

extend the search window while the preamble signal pattern continues to be detected; and do not extend the search pattern when the preamble signal pattern is no longer detected based on a number of the most-recently sampled detection windows having error values below the threshold value falling below the threshold proportion.

16. The apparatus of claim 11 comprising the data channel further configured to:

calculate a phase estimate for each group of sample values;

determine a difference between the phase estimates for each pair of consecutive groups; and determine the frequency offset based on a summation of the differences between the phase estimates for each pair of consecutive groups.

17. An apparatus comprising:

a data channel configured to detect a selected pattern within a signal, including:

sample the signal to obtain sample values;

divide the sample values into a first set of groups;

determine error values for the first set of groups;

determine selected groups from the first set of groups that correspond to the selected pattern based on the selected groups having error values below a threshold; and detect the selected pattern based on the selected groups.

18. The apparatus of claim 17 comprising the data channel further configured to:

organize consecutive samples corresponding to the selected groups in a second set of groups;

determine a frequency offset between a sampling rate at which the selected groups were sampled and an expected sampling rate based on the selected groups; and modulate the sampling frequency based on the frequency offset.

19. The apparatus of claim 18 further comprising:

the selected signal pattern is a preamble pattern of a servo sector recorded to a disc data storage medium;

the data channel further configured to:

detect a servo timing mark of the servo sector using the sampling frequency once it has been modulated;

read the servo sector once the servo timing mark is detected; and identify a location of a read head relative to the disc data storage medium based on the servo sector.

20. The apparatus of claim 19 further comprising:

the disc data storage medium;

the data channel further configured to:

detect the selected signal pattern when a selected proportion of most-recently sampled groups from the first set of groups have error values below a threshold value;

determine a phase estimate for each group of the selected groups representing a phase at which samples of the selected groups were sampled;

compare the phase estimates for consecutive groups of the selected groups; and determine the frequency offset based on the phase estimates.

* * * * *